(12) United States Patent
Takiguchi et al.

(10) Patent No.: US 6,874,979 B2
(45) Date of Patent: Apr. 5, 2005

(54) THROW-AWAY TIP FOR USE IN DRILLING WORK AND THROW-AWAY DRILLING TOOL

(75) Inventors: Syoji Takiguchi, Anpachi-gun (JP); Yasuhiko Kawade, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 102 days.

(21) Appl. No.: 10/105,414

(22) Filed: Mar. 26, 2002

(65) Prior Publication Data

US 2003/0012613 A1 Jan. 16, 2003

(30) Foreign Application Priority Data

| Jul. 5, 2001 | (JP) | P2001-205007 |
| Jul. 5, 2001 | (JP) | P2001-205008 |
| Jul. 5, 2001 | (JP) | P2001-205009 |
| Jul. 9, 2001 | (JP) | P2001-208220 |

(51) Int. Cl.$^7$ .............. B23B 51/00; B23D 77/00; B23P 15/28
(52) U.S. Cl. .............. 408/227; 408/230; 407/113
(58) Field of Search .............. 408/227, 230, 408/713; 407/113

(56) References Cited

U.S. PATENT DOCUMENTS

| 4,373,839 A | | 2/1983 | Negishi et al. | |
| 4,844,669 A | * | 7/1989 | Tsujimura et al. | 408/188 |
| 4,961,672 A | * | 10/1990 | Lindberg | 408/144 |
| 5,816,754 A | * | 10/1998 | Shallenberger | 408/227 |
| 5,829,927 A | * | 11/1998 | Nakamura et al. | 408/230 |
| 5,951,213 A | * | 9/1999 | Fauser et al. | 407/35 |
| 6,024,519 A | * | 2/2000 | Okui et al. | 407/113 |
| 6,238,151 B1 | | 5/2001 | Takagi | |
| 6,354,773 B1 | * | 3/2002 | Konen | 408/213 |
| 2001/0031178 A1 | * | 10/2001 | Remke et al. | 408/1 R |
| 2002/0044843 A1 | | 4/2002 | Suzuki et al. | |
| 2003/0039522 A1 | | 2/2003 | Yanagida et al. | |

FOREIGN PATENT DOCUMENTS

WO    WO 01/45886 A1    6/2001

OTHER PUBLICATIONS

Partial European Search Report dated Aug. 8, 2002.
Specification, Claims, Abstract and Drawings of U.S. Appl. No.: 10/650,683, Drill and Production Method Thereof.

* cited by examiner

Primary Examiner—A. L. Wellington
Assistant Examiner—Brian D. Walsh
(74) Attorney, Agent, or Firm—Rader, Fishman & Grauer PLLC

(57) ABSTRACT

A throw-away tip for use in drilling work that has a convexly curved cutting edge portion at one end side of a cutting edge is provided. Chips are prevented from being sheared and packed, and cutting edge strength is secured to extend the service life of the tip. The tip is used with a drilling tool having a tool body rotatable about an axis and has a convexly curved surface formed on a rake face thereof on the one end side of the cutting edge, which forms a curve toward a seat face thereof as it proceeds toward the one end side of the cutting edge. The convexly curved cutting edge portion is formed at the side ridge of the convexly curved surface coinciding with the cutting edge and forms a substantially arc shape projecting in the direction of rotation of the tool when the tip body is viewed from the distal end side in the direction of the axis of the tool body, or when the tip body is viewed in a direction from closer to the other end of the cutting edge toward the inner periphery of the rear end of the tool. A throw-away tip is also provided which provides a stabilized cutting behavior and a reduced cutting force. A throw-away drilling tool is also provided that uses the above throw-away tip.

14 Claims, 11 Drawing Sheets

THROW-AWAY TIP FOR USE IN DRILLING WORK AND THROW-AWAY DRILLING TOOL

BACKGROUND OF THE INVENTION

1. Field of the Invention

The present invention relates to a throw-away tip (hereinafter referred to as a tip) for use in drilling work adapted to be attached to a throw-away drilling tool or the like for use in drilling work, and also to a throw-away drilling tool (hereinafter referred to as a drilling tool) attached with such a tip.

2. Description of the Related Art

As a tip of this type, there is proposed in Japanese Patent Application No. Hei 11-45482 one as shown in FIGS. 4 and 5. The tip shown in these Figures has a tip body 1 provided in the form of a substantially pentagonal plate, with one of the pentagonal surfaces formed as a rake face 2 and one side surface formed as a flank face 3. A cutting edge 4 is formed at a side ridge of the rake face 2 where the rake face 2 crosses the flank face 3 (along a crossing ridge between the rake face 2 and the flank face 3). The flank face 3 and another side surface 5 of the tip body 1 are disposed in crossed directions at a corner C at one end 4a side of the cutting edge 4. On the rake face 2 on the corner C, there are formed along the side surface 5 in the order from the corner C, a cylindrical surface 2a having a center line parallel to the side surface 5 and the other pentagonal surface constituting a seat face 6 for the tip body 1, which proceeds toward the seat face 6 while convexly curving as it proceeds towards the side surface 5, and a rising surface 2b continuous to the cylindrical surface 2a and gradually rising as it proceeds apart from the corner C side. Consequently, a convexly curved cutting edge portion 4A is formed at one end 4a side of the cutting edge 4, at the crossing ridge between the cylindrical surface 2a and the flank face 3, which cutting edge portion 4A curves convexly in an arc shape as shown in FIG. 5, as viewed from a direction opposing the flank face 3 along the above center line (as viewed in the direction of an arrow E in FIG. 4). The other end 4b side of the cutting edge 4, as viewed from the same direction, smoothly adjoins the arc formed by the convexly curved cutting edge portion 4A of the cutting edge 4 and extends parallel to the seat face 6 to form a straight cutting edge portion 4B.

A pair of the thus constituted tips, as shown in FIG. 6, are mounted at the distal end of a substantially columnar tool body 7 of a throw-away drilling tool rotatable about an axis O, in symmetrical relation about the axis O to be used in drilling work. In other words, a pair of chip discharge grooves 8 and 8 are provided, in symmetrical relation about the axis O, in the outer periphery of the tool body 7 to extend from the distal to proximal end of the tool body 7 while twisting around the axis O rearwardly in a direction of rotation T of the tool. A tip-mounting seat 9 is formed at the distal end of a wall surface 8a of each chip discharge groove 8 facing in the direction of rotation T of the tool, and the tip is mounted on the respective tip-mounting seat 9, with the rake face 2 facing in the direction of rotation T of the tool, the flank face 3 facing the distal end of the tool, and the side surface 5 facing the inner periphery of the tool. The tip has its seat face 6 seated on the bottom surface of a tip-mounting seat and is detachably fixed in place with a clamp screw 10. In this mounted condition, the one end 4a of the cutting edge 4 is located in the vicinity of the axis O at the distal end of the tool body 7 and the other end 4b is located at the outer periphery of the distal end of the tool, to provide the cutting edge 4 with a point angle that proceeds toward the proximal end of the tool as it proceeds toward the tool outer periphery. It is arranged such that the convexly-curved cutting edge portion 4A convexes in the direction of rotation T of the tool.

With a drilling tool with the above tip mounted like this, because the cutting edge 4 at the one end 4a side near the axis O of the tool body 7 is formed in a curve shape projecting in the direction of rotation T of the tool by the convexly-curved cutting edge portion 4A, a reduction is made in the rotational speed and a cutting-edge strength may be secured in the vicinity of the axis O where a great load acts. Incidentally, when a pair of tips are mounted on the tip-mounting seats 9 and 9 at the distal end of the chip discharge grooves 8 and 8, there is formed a very small clearance between the one ends 4a and 4a of their cutting edges 4 and 4 located near the axis O so as to reduce the thrust load of the load as mentioned above. In addition, a recess 7a is provided rearwardly of the clearance, at the center of the distal end of the tool body 7, which is in communication with the chip discharge grooves 8, 8. The provision of such a clearance between the one ends 4a, 4a of the cutting edges 4, 4 allows a core of a work piece that grows along the axis O during drilling work to be received in the recess 7a and discharged through the chip discharge grooves 8, 8. Furthermore, at the tool inner periphery side of each tip-mounting seat 9, a wall surface 9a is formed that is inclined toward the tool outer periphery as it proceeds toward the proximal end (rear end) of the tool. By such wall surfaces 9a, 9a of both tip-mounting seats 9, 9, on a side rearward of the recess 7a at the distal end of the tool body 7, a wall is formed around the axis O that gradually becomes thicker toward the rear end of the tool, so that strength is secured at the distal end of the tool body 7. The tip is mounted, with its side surface 5 that faces the inner periphery of the tool abutting against the related wall surface 9a.

With the above structure in which the wall surface 9a of the tip-mounting seat 9 inclinedly proceeds toward the tool outer periphery as it proceeds toward the tool distal end, and the tip body 1 is mounted, with its side surface 5 contacted with the wall surface 9a, the center line of the above cylindrical surface 2a, which is in parallel to the side surface 5, also inclinedly proceeds toward the tool outer periphery as it proceeds toward the tool distal end, as viewed from a direction opposing the rake face 2. Hence, the direction in which the one end 4a side portion of the cutting edge 4 formed at the crossing ridge between the cylindrical surface 2a and the flank face 3 looks to form an arc shape, i.e., the direction indicated by the arrow E in FIG. 4 will, as shown for each tip in FIG. 6, also become a direction in which the tip body 1 of one tip is viewed, with an eye cast from near the one end 4a of the cutting edge 4 of the other tip on the opposite side of the axis O toward the outer periphery of the rear end of the tool, rather than the direction of viewing the tip body 1 of the one tip from the tool distal end along the axis O of the tool body 7.

With this structure, however, in which the center line of the cylindrical surface 2a is inclined toward the tool outer periphery as it proceeds toward the tool rear end, and the one end 4a side portion of the cutting edge 4 forms an arc shape when the tip body 1 is viewed in a direction from near the one end 4a toward the outer periphery of the tool rear end, the cylindrical surface 2a drops with a sharp curvature toward the seat face 6 as it proceeds away from the cutting edge 4. Due to this, of the chips produced by the cutting edge 4, that part produced by the straight cutting edge portion 4B at the other end 4b side of the cutting edge 4 flow out in a direction perpendicular to the cutting edge 4, whereas that part produced by the convexly-curved cutting edge portion 4A at the one end 4a side are guided to flow out in that direction in which the cylindrical surface 2a drops or toward the inner periphery of the tool. The flow in different directions of the chips produced at the one end 4a side and at the other end 4b side of the cutting edge 4 causes the chips to be sheared apart in the width direction thereof, and that part of the chips produced by the convexly-curved cutting edge portion 4A are guided along the cylindrical surface 2a toward the inner periphery of the tool and flows into the recess 7a at the center of the distal end of the tool body 1 to be packed therein.

Furthermore, with the conventional tip, because the cylindrical surface 2a of the rake face 2 is formed to drop toward the seat face 6 with a sharp curvature in a direction perpendicular to the cutting edge 4, the included angle of the convexly-curved cutting edge portion 4A at the one end 4a side of the cutting edge 4, in section perpendicular to the cutting edge 4, becomes small, resulting in a reduced cutting-edge strength. Especially because the one end 4a side of the cutting edge 4 is subject to a great load as mentioned above due to its proximity to the axis O when the tip is mounted on the tool body 7, it is necessary for the cutting edge 4 to secure sufficient cutting-edge strength at that portion. Otherwise, if the convexly-curved cutting edge portion 4A is provided at the one end 4a side of the cutting edge 4 to form a curve projecting in the direction of rotation T of the tool, breakage or chipping will occur at the time of biting into a work piece or during drilling work, making it necessary to replace the tip.

Description of another drawback to a conventional tip of this type will now be made.

A drilling tool, as mentioned above, is conventionally comprised of a substantially columnar tool body rotatable about an axis, a pair of chip discharge grooves formed in an outer periphery of the tool body, and tip-mounting seats formed at the distal end of the respective wall surfaces of the chip discharge grooves facing in the direction of rotation of the tool. A tip provided, for example, in the form of a substantially pentagonal plate is mounted on each tip-mounting seat, with one polygonal surface thereof facing as a rake face in the direction of rotation of the tool, and one side surface thereof facing as an end flank face the distal end of the tool body. A cutting edge is formed along the crossing ridge between the rake face and the end flank face.

In such a tip as mentioned above, another side surface that adjoins the end flank face and faces the outer periphery of the tool body is formed at the rake face side with a cylindrical surface that convexly curves from the rake face toward the other pentagonal surface (seat face) to provide a margin for use in drilling work. In other words, the margin, when the tip is mounted on the tool body, faces the outer periphery of the tool body and constitutes a part of a cylindrical surface centering around the axis of the tool body, and comes into sliding contact with the inner wall surface of a hole being drilled during drilling work to stabilize the cutting behavior, advancing the tool body, and improving the accuracy of the inner wall surface of the drilled hole.

With a drilling tool that uses such a tip as mentioned above, in order to realize improved stability of the cutting behavior, it is necessary to set the width and length of the margin of a tip to a certain size. A drawback to this is that the area of the margin that comes into sliding contact with the inner wall surface of a hole being drilled is enlarged, causing an increase in cutting force and a reduction in working efficiency. Because of the above, difficulty has been encountered in managing both to stabilize the cutting behavior to realize progressiveness of the tool body and to reduce the cutting force to improve the working efficiency.

Furthermore, with a drilling tool that uses such a tip as mentioned above, the margin is formed straight and is provided with a slight back taper, as viewed from a direction opposing the rake face of the tip, in other words, the margin is slightly inclined toward the inner periphery of the tool body as it proceeds toward the proximal end of the tool body.

As a result, if there is the slightest irregularity in the mounting accuracy of the tip resulting from variations in working accuracy of the tip-mounting seat, its impairment due to wear or the like, it possibly causes the back taper to be reversed; in other words, the margin possibly becomes inclined toward the outer periphery of the tool body as it proceeds toward the distal end thereof, so as to eliminate a relief from the margin. If this is the case, the cutting force encountered during drilling work becomes very large, resulting in instability of cutting behavior and occurrence of chatter or vibration, and deterioration of the inner wall surface accuracy of a drilled hole.

Furthermore, with a drilling tool that uses such a tip as mentioned above, the margin of the tip is formed to have a width, or a length of the margin in a direction perpendicular to the axis of the tool body, that is equal from the rear to the distal end side in the direction of the axis.

As a result, the margin does not have sufficient area at its distal end side near the cutting edge, and advance of the tool body may not be obtained due to this shortness of area at the distal end side of the margin, at the time of biting into a work when a greater cutting behavior stability is required, resulting in impairment of positional accuracy of a hole drilled. To cope with this, if the margin is formed with a larger width than usual, the rear end side portion of the margin now having an excessive area causes an increase in the cutting force due to its contact with the inner wall surface of the hole during drilling work.

SUMMARY OF THE INVENTION

The present invention has been made under such circumstances, and accordingly, it is an object of the present invention to provide a tip having a convexly-curved cutting edge portion at one end side of its cutting edge, which prevents the chips from being sheared by the cutting edge portion and being packed, and which secures sufficient cutting-edge strength at the cutting edge portion to have a long service life.

It is another object of the present invention to provide a tip and a drilling tool which provide stable cutting behavior and which reduce the cutting force.

It is a further object of the present invention to provide a tip and a drilling tool which reliably impart a relief to the margin if the mounting accuracy of a tip deteriorates.

It is yet another object of the present invention to provide a tip and a drilling tool which stabilize the cutting behavior without causing an increase in the cutting force.

In order to attain the above objects, according to an aspect of the present invention, there is provided a throw-away tip for use in drilling work which is used with a drilling tool having a tool body rotatable about an axis, comprising: a tip body formed as a substantially polygonal plate, which has a rake face formed on one polygonal surface thereof and a cutting edge formed at a side ridge of the rake face, one end of the cutting edge being positioned adjacent the axis at a distal end of the tool body of the drilling tool and the other end of the cutting edge being positioned at an outer periphery of the distal end of the tool body such that the cutting edge has a point angle proceeding toward a rear end of the tool as it proceeds toward the outer periphery of the tool, and that the rake face faces in a direction of rotation of the tool; a convexly curved surface formed on the rake face at least at a side of the one end of the cutting edge, which forms a curve toward the other polygonal surface of the tip body as it proceeds toward the side of the one end of the cutting edge; and a convexly curved cutting edge portion formed at a side ridge of the convexly curved surface coinciding with the side ridge of the rake face at the side of the one end of the cutting edge such that it forms a substantially arc shape projecting in the direction of rotation of the tool when the tip body is viewed from a distal end side in a direction of the axis, or when the tip body is viewed in a direction from a position closer to the other end of the cutting edge toward the inner periphery of the rear end of the tool.

Thus, in contrast to the conventional tip in which the cutting edge at the one end side forms an arc shape when the tip body is viewed in a direction from near the one end of the cutting edge, the convexly curved cutting edge portion of the tip according to the present invention forms a substantially arc shape when the tip body is viewed from the distal end side in the direction of the axis of the tool body, or when the tip body is viewed in a direction from nearer to the other end of the cutting edge toward the inner periphery of the rear end of the tool. In the tip of the present invention thus constructed, the convexly curved surface formed on the rake face to be continuous to the substantially arc-shaped convexly curved cutting edge portion, when formed for example as a cylindrical surface as in the conventional tip, also has a center line that is parallel to the axis of the tool body, or a center line that is inclined toward the tool inner periphery as it proceeds from nearer to the other end of the cutting edge toward the tool rear end. In other words, because the extending direction of the center line of the convexly curved surface comes closer to a direction perpendicular to the cutting edge with the point angle as mentioned above, the curvature of the convexly curved surface in that direction toward the other polygonal surface can be made gentle, making it possible to prevent the chips produced at the convexly curved cutting edge portion from being guided to flow out toward the tool inner periphery and sheared off, while at the same time imparting a large included angle to the convexly curved cutting edge portion of the cutting edge to provide an improved cutting edge strength.

Preferably, as viewed in a direction in which the convexly curved cutting edge portion looks to form the substantially arc shape, the substantially arc shape has a radius that is 28% to 42% of a diameter D of a circle formed by the other end of the cutting edge around the axis of the tool body, and one end of the convexly curved cutting edge portion is located at a height that is 5% to 10% of the diameter D from the other polygonal surface of the tip body, and further comprising a straight cutting edge portion formed at a side of the other end of the cutting edge, the straight cutting edge portion adjoining the convexly curved cutting edge portion and extending straight therefrom, and wherein a width of the convexly curved cutting edge portion between the one end thereof and a contact with the straight cutting edge portion is 13% to 20% of the diameter D.

This is because, if the above radius is too small, if the height of the one end is too small, or if the width is too great, the curvature of the convexly curved surface becomes sharp so that shearing of chips may not be reliably prevented, irrespective of the direction that enables the convexly-curved cutting edge portion to appear to form an arc shape, shifted as mentioned above. On the contrary, if the radius is too great, if the height of the one end is too great, or if the width is too small, the cutting edge approximates a straight line overall. As a result, there arises a fear that the effect itself of improving the cutting-edge strength by providing the convexly-curved cutting edge portion near the axis of the tool body in such a manner as to convex in the direction of rotation of the tool, will not be sufficiently obtained.

Preferably, the throw-away tip for use in drilling work further comprises, as viewed in a direction in which the convexly curved cutting edge portion looks to form the substantially arc shape, a small straight cutting edge portion formed at the side of the one end of the cutting edge, the small cutting edge portion crossing the convexly curved cutting edge portion at an obtuse angle at one end of the convexly curved cutting edge portion and extending toward the other polygonal surface of the tip body.

Incidentally, it is sufficient if the convexly curved cutting edge portion is formed in a substantially arc shape when the tip body is viewed from the distal end side in the direction of the axis of the tool body, or when the tip body is viewed in a direction from closer to the other end of the cutting edge toward the inner periphery of the rear end of the tool. For example, the convexly-curved cutting edge portion may be formed of a plurality of short straight lines connected to one another in an arc shape. In such a case, the above radius of the convexly-curved cutting edge portion is obtained as the radius of an arc approximating the plurality of straight lines.

A throw-away tip for use in drilling work is also provided which comprises: a tip body formed as a substantially polygonal plate, which has a rake face formed on one polygonal surface thereof, a first side ridge of the rake face where a cutting edge is formed, a second side ridge of the rake face extending in a direction that crosses the first side ridge at one end thereof at an acute angle, and a third side ridge of the rake face crossing the first side ridge at the other end thereof at an obtuse angle; a convexly curved surface formed on the rake face at least at a side of the one end of the cutting edge, which forms a curve toward the other polygonal surface of the tip body as it proceeds toward the side of the one end of the cutting edge; and a convexly curved cutting edge portion formed at a side ridge of the convexly curved surface coinciding with the first side ridge of the rake face at the side of the one end of the cutting edge such that it forms a substantially arc shape to project in a direction opposite the other polygonal surface of the tip body when the tip body is viewed, from a side of the first ridge, in a direction parallel to the third ridge of the rake face, or in a direction from a position closer to the other end of the cutting edge than the direction parallel to the third ridge toward the second ridge of the rake face.

According to another aspect of the present invention, there is provided a throw-away tip for use in drilling work comprising: a tip body formed as a substantially polygonal plate, which has a rake face formed on one polygonal surface thereof, one side surface serving as a flank face, and a cutting edge formed along a crossing ridge between the rake face and the flank face; another side surface adjoining the flank face, which has a cylindrical surface formed thereon that forms a convex curve from the rake face toward the other pentagonal surface of the tip body to provide a margin used in drilling work; and at least one groove formed on the margin.

A throw-away drilling tool is also provided which comprises: a pair of chip discharge grooves formed in an outer periphery of a tool body rotatable about an axis; a tip-mounting seat provided at a distal end of a wall surface of each of the chip discharge grooves facing in a direction of rotation of the tool; and a throw-away tip as mentioned above mounted on the tip-mounting seat such that the rake face of the throw-away tip faces in the direction of rotation of the tool, the flank face faces a distal end of the tool body, and the margin faces the outer periphery of the tool body to constitute a part of a cylindrical surface centering around the axis.

Such a structure causes a reduction in the area of the margin that slidingly contacts the inner wall surface of a hole drilled as much as the area by which the grooves are formed, making it possible to reduce the cutting force. Furthermore, because the width, length and the like of the margin remain as they are, a stabilized cutting behavior can also be obtained.

Preferably, the at least one groove is formed in a thickness direction of the tip body.

With such a structure, because the grooves, when the tip is mounted on the tool body of a drilling tool, are arranged to extend in the direction of rotation of the tool body and divide the margin in a row of sections relative to the direction of rotation, the cutting force can be reliably reduced.

According to a further aspect of the present invention, there is provided a throw-away tip for use in drilling work comprising: a tip body formed as a substantially polygonal plate, which has a rake face formed on one polygonal surface thereof, one side surface serving as a flank face, and a cutting edge formed along a crossing ridge between the rake face and the flank face; and another side surface adjoining the flank face, which has a cylindrical surface formed thereon that forms a convex curve from the rake face toward the other pentagonal surface of the tip body to provide a margin used in drilling work, wherein the margin, when the throw-away tip is mounted on a drilling tool, forms a radius having a center of curvature at a point located at the same position as the distal end of the margin or forwardly thereof in a direction of an axis of the drilling tool, as viewed from a direction opposing the rake face.

A throw-away drilling tool is also provided which comprises: a pair of chip discharge grooves formed in an outer periphery of a tool body rotatable about an axis; a tip-mounting seat provided at a distal end of a wall surface of each of the chip discharge grooves facing in a direction of rotation of the tool; and a throw-away tip as mentioned above mounted on the tip-mounting seat such that the rake face of the throw-away tip faces in the direction of rotation of the tool, the flank face faces a distal end of the tool body, and the margin faces the outer periphery of the tool body to constitute a part of a cylindrical surface centering around the axis.

With such a structure, the margin of the tip forms a radius that is gradually inclined toward the inner periphery of the tool body as it proceeds from the distal end side to the rear end side of the tool body, so that the margin is automatically provided with a relief or a back taper. Because a relief is provided by the radius of the margin, if the mounting accuracy of a tip is somewhat impaired, a relief corresponding to the back taper is securely obtained by this radius. In addition, because the margin, which convexes toward the outer periphery of the tool body as viewed from a direction opposing the rake face, smoothly scrapes the inner wall surface of a hole drilled, the inner wall surface accuracy can be improved.

Preferably, the radius formed by the margin has a radius of curvature set in the range of 100 to 1000 mm.

Here, if the radius of curvature of the radius formed by the margin is too small, the relief provided on the margin becomes excessive, making it impossible to stabilize the cutting behavior, and in contrast, if the radius of curvature of the radius formed by the margin is too large, the relief provided on the margin becomes too small, possibly giving rise to the reverse of the back taper depending on the mounting accuracy of the tip. Thus, the radius of curvature of the radius formed by the margin is set in the range of 100 to 1000 mm in the present invention to make appropriate the relief imparted to the margin.

According to yet another aspect of the present invention, there is provided a throw-away tip for use in drilling work comprising: a tip body formed as a substantially polygonal plate, which has a rake face formed on one polygonal surface thereof, one side surface serving as a flank face, and a cutting edge formed along a crossing ridge between the rake face and the flank face; and another side surface adjoining the flank face, which has a cylindrical surface formed thereon that forms a convex curve from the rake face toward the other pentagonal surface of the tip body to provide a margin used in drilling work, wherein the margin, when the throw-away tip is mounted on a drilling tool, has a gradually increasing width Tgi that becomes gradually greater from a rear end side toward a distal end side in a direction of an axis of the drilling tool.

A throw-away drilling tool is also provided which comprises: a pair of chip discharge grooves formed in an outer periphery of a tool body rotatable about an axis; a tip-mounting seat provided at a distal end of a wall surface of each of the chip discharge grooves facing in a direction of rotation of the tool; and a throw-away tip as mentioned above mounted on the tip-mounting seat such that the rake face of the throw-away tip faces in the direction of rotation of the tool, the flank face faces a distal end of the tool body, and the margin faces the outer periphery of the tool body to constitute a part of a cylindrical surface centering around the axis.

With such a structure, because the distal end side portion of the margin in the direction of the axis has a large area, the distal end side portion of the margin near the cutting edge slidingly contacts the inner wall surface of a hole drilled by a large area, so as to stabilize the cutting-edge behavior, especially at the time of biting into a work when a greater stabilization in the cutting edge behavior is required. In addition, because the area is set smaller at the rear end side portion of the margin than at the distal end side portion thereof, an increase will not be caused in the cutting force.

Preferably, a width T1 of the margin at the most distal end side in the direction of the axis of the drilling tool, relative to an outer diameter D of cutting edges of the drilling tool, is set in the range of $0.08D \leq T1 \leq 0.20D$, and a width T2 of the margin at the most rear end side in the direction of the axis, relative to the outer diameter D of the cutting edges of the drilling tool, is set in the range of $0.03D \leq T2 \leq 0.08D$.

Here, if the width of the margin at the most distal end side in the direction of the axis is too small, area cannot be secured for the margin that is necessary to stabilize the cutting edge behavior, and in contrast, if the width of the margin is too great, it may increase the cutting force. Likewise, if the width of the margin at the most rear end side in the direction of the axis is too small, the cutting edge behavior will not be stabilized, and in contrast, if the width of the margin is too large, an increase will be caused in the cutting force. Thus, in the present invention the widths of the margin are set in the appropriate range as mentioned above.

Preferably, the length L of the margin in the direction of the axis of the drilling tool, relative to the outer diameter D of the cutting edges of the drilling tool, is set in the range of $0.13D \leq L \leq 0.25D$.

Here, if the length of the margin in the direction of the axis is to small, the cutting edge behavior will not be stabilized, and in contrast, if the length of the margin is too great, an increase will be made in the cutting force. Thus, the length of the margin is set in the appropriate range as mentioned above in the present invention.

The above and other objects and features of the present invention will become more apparent from the following description taken in conjunction with the accompanying drawings.

BRIEF DESCRIPTION OF THE DRAWINGS

FIGS. 3E to 3H are sections taken along the line X—X in FIG. 1 when convexly-curved cutting edge portions form an arc shape, as viewed in the directions of arrows E to H, respectively, of which FIG. 3E is a section of a conventional throw-away tip;

DETAILED DESCRIPTION OF THE PREFERRED EMBODIMENTS

Preferred embodiments of the present invention will now be described with reference to the accompanying drawings.

Figure 1:
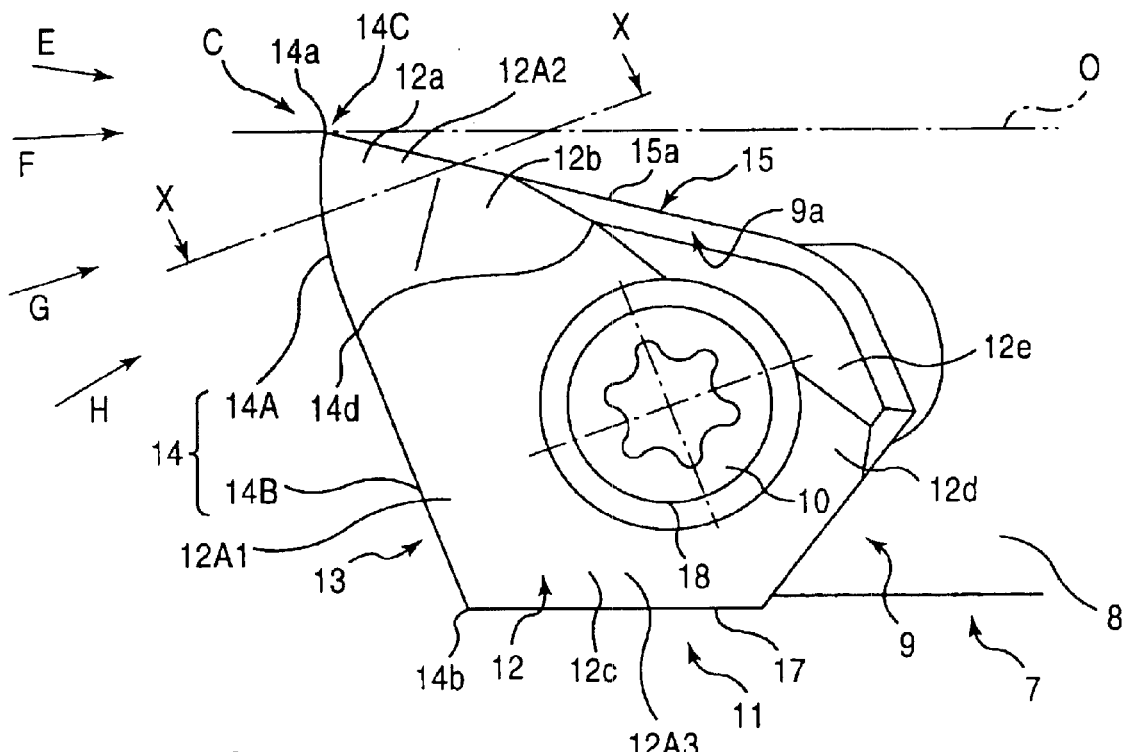
FIG. 1 is a plan view of a throw-away tip for use in drilling work according to one embodiment of the present invention, mounted at the distal end of a tool body, as viewed from a direction opposing its rake face.
Figure 2:
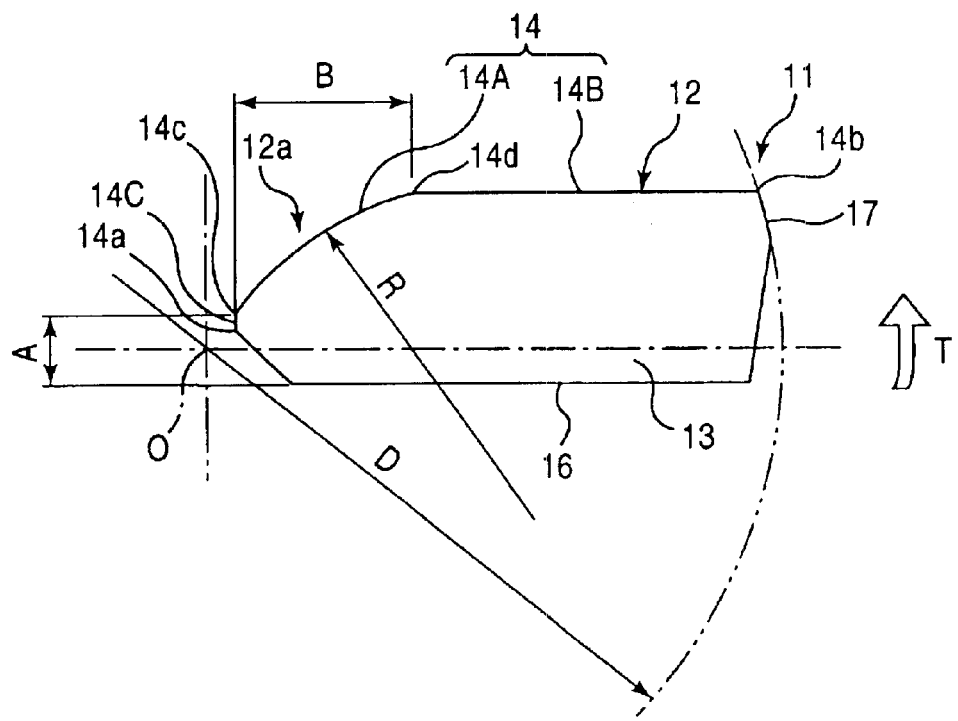
FIG. 2 is a side view of the throw-away tip for use in drilling work as viewed from the direction of an arrow F in FIG. 1.

FIGS. 1 to 3 show a first embodiment of the present invention. In the tip according to the present embodiment, a tip body 11 is made of hard material, such as a cemented carbide alloy, in the form of a substantially pentagonal plate. One pentagonal surface of the tip body 11 forms a rake face 12 and one side surface forms a flank face 13, and a cutting edge 14 is formed along the side ridge of the rake face 12 where it crosses the flank face 13. The rake face 12 includes a first side ridge 12A1 of the rake face 12 where the cutting edge 14 is formed, a second side ridge 12A2 of the rake face 12 extending in a direction that crosses the first side ridge 12A1 at one end thereof at an acute angle, and a third side ridge 12A3 of the rake face 12 crossing the first side ridge 12A1 at the other end thereof at an obtuse angle. Another side surface 15 of the tip body 11 that adjoins the side surface constituting the flank face 13 is disposed in a crossing direction with the flank face 13 at an acute angle at a corner C at one end 14a side of the cutting edge 14. This tip, like the conventional tip as mentioned hereinabove, is mounted on a tip-mounting seat 9 provided at the distal end of a chip discharge groove 8 of a tool body 7 of a throw-away drilling tool rotatable about an axis O, with the one end 14a of the cutting edge 14 positioned in the vicinity of the axis O, the other end 14b of the cutting edge 14 positioned at the outer periphery of the distal end of the tool body 1, so as to provide a point angle that proceeds toward the rear end of the tool as it proceeds toward the tool outer periphery. In other words, the tip is detachably fixed with a clamp screw 10 in such a manner that the other pentagonal surface opposite the rake face 12, which forms a seat face 16, is seated on the tip-mounting seat 9, with the rake face 12 facing in the direction of rotation T of the tool, the flank face 13 facing the tool distal end, and the side surface 15 being in contact with the wall surface 9a of the tip-mounting seat 9 that proceeds toward the outer periphery of the tool as it proceeds toward the rear end of the tool.

Furthermore, also in the present embodiment, the rake face 12 is formed at corner C side with a cylindrical surface 12a as a convexly-curved face that has a center line extending parallel to the seat face 16 and proceeds toward the seat face 16 while forming a convex curve as it proceeds toward the corner C side. A rising surface 12b is formed rearwardly of the cylindrical surface 12a. At the one end 14a side of the cutting edge 14, a convexly-curved cutting edge portion 14A is formed along the crossing ridge between the cylindrical surface 12a and the flank face 13, and at the other end 14b side of the cutting edge 14, a straight cutting edge portion 14B is formed to smoothly adjoin the convexly-curved cutting edge portion 14A and to extend parallel to the seat face 16. On the rake face 12 other than where the cylindrical surface 12a and the rising surface 12b are formed, an inclined plane 12c is formed which is continuous to the cutting edge 14 and is inclined at a constant gradient toward the seat face 16 as it proceeds away from the cutting edge 14, and on the side of the inclined plane 12c opposite the cutting edge 14, a flat plane 12e parallel to the seat face 16 is formed by way of a breaker wall surface 12d rising, while forming a concave curve, from the inclined plane 12c. The width of the inclined plane 12c and the breaker wall surface 12d in a direction perpendicular to the cutting edge 14 become gradually greater as they proceed along the cutting edge 14 toward the other end 14b side of the same. A side surface 17 of the tip body 11 that crosses the flank face 13 at the other end 14b of the cutting edge 14 crosses the flank face 13 at an obtuse angle so that when the tip body 11 is mounted in the above-mentioned manner on the tip-mounting seat 9 of the tool body 7, that portion of the side surface 17 located forwardly in the direction of rotation T of the tool forms a cylindrical surface that centers around the axis O of the tool body 7, extends parallel to the axis O as viewed from a direction opposing the rake face 12, and forms a margin for the drilling tool. Furthermore, a mounting hole 18 is perforated from the rake face 12 to the seat face 16 for insertion therethrough of the clamp screw 10.

In contrast to the above-mentioned conventional tip in which the center line of the cylindrical surface 2a is parallel also to the side surface 5 that crosses the flank face 3 at an acute angle at the corner C at the one end 4a side of the cutting edge 4, in the tip according to the present embodiment, the center line of the cylindrical surface 12a, as viewed from a direction opposing the rake face 12, extends parallel to the side surface 17 that crosses the flank face 13 at an obtuse angle at the other end 14b side of the cutting edge 14, or is inclined in a direction approaching the side surface 17 as it proceeds toward the flank face 13 and crossing the side surface 15 at a position remote from the corner C, which side surface 15 crosses the flank face 13 at an acute angle at the corner C on the one end 14a side of the cutting edge 14. Consequently, when such a tip is mounted on the tool body 7, as compared with the conventional tip with which the center line of the cylindrical surface 2a is inclined toward the outer periphery of the tool as it proceeds toward the rear end of the tool, and the direction that enables the convexly-curved cutting edge portion 4A at the one end 4a side of the cutting edge 4 to look to form an arc shape is the direction of viewing the tip body 1 with an eye cast from near the one end 14a of the cutting edge 4 toward the outer periphery of the rear end of the tool rather than the direction of viewing from the distal end of the tool along the axis O of the tool body 7 as indicated by an arrow E in FIG. 1, with the tip according to the present embodiment, the convexly-curved cutting edge portion 14A forms an arc shape projecting in the direction of rotation T of the tool when the Up body 11 is viewed in a direction from the distal end of the tool along the axis O as indicated by an arrow F in FIG. 1, or in a direction as indicated by an arrow G or H in FIG. 1, from a position closer to the other end 14b of the cutting edge 14 than that indicated by the arrow F, toward the inner periphery of the rear end of the tool.

When viewed in the direction that enables the convexly-curved cutting edge portion 12A to look arc-shaped, for example, in the case where, as shown in FIG. 2, the convexly-curved cutting edge portion 14A forms an arc shape when viewed, from the distal end side of the tool, in the direction of the arrow F parallel to the axis O, the radius R of the arc formed by the convexly-curved cutting edge portion 14A is from 28% to 42% of the diameter D of a circle formed by the other end 14b of the cutting edge 14 around the axis O of the tool body 11, i.e., the outer diameter of the cutting edges of the throw-away drilling tool. In this instance, one end 14c of the convexly-curved cutting edge portion 14A is disposed at a height A that amounts to from 5% to 10% of the above diameter D from the other polygonal surface constituting the seat face 16 for the tip body 11, and the width B of the convexly-curved cutting edge portion 14A from a contact 14d between the convexly-curved and straight cutting edge portions 14A and 14B to the above one end 14c in a direction parallel to the straight cutting edge portion 14B is from 13% to 20% of the above diameter D. Furthermore, at a substantially mid-portion of the side surface 15 in the height A direction, a flat plane 15a of small width, which is vertical to the seat face 16, extends along the side surface 15 and crosses the flank face 13 so as to form a small straight cutting edge portion 14C at the one end 14a of the cutting edge 14, which cutting edge portion C crosses the convexly-curved cutting edge portion 14A at an obtuse angle at the above one end 14c of the cutting edge portion 14A and extends toward the seat face 16. Incidentally, those portions of the side surface 15 that are located between the flat plane 15a and the seat face 16 and between the flat plane 15a and the flat plane 12e of the rake face 12 cross the flat planes 15a and 12e, and the seat face 16 at an obtuse angle or angles.

With the thus constructed tip mounted on the tool body 7 of the throw-away drilling tool, the convexly-curved cutting edge portion 14A at the one end 14a side of the cutting edge 14 located on the inner periphery side of the tool forms an arc shape when the tip body 11 is viewed in a direction along the axis O from the distal end of the tool body 7, or when the tip body 11 is viewed in a direction from a position closer to the other end 14b of the cutting edge 14 toward the inner periphery at the rear end of the tool. Likewise, the cylindrical surface 12a as a convexly curved surface adjoining the convexly-curved cutting edge portion 14A and disposed on the rake face 12 on the inner periphery side of the distal end of the tool, has its center line extending parallel to the axis O of the tool body 7, or inclined to proceed toward the inner periphery of the tool as it proceeds from a position closer to the other end 14b of the cutting edge 14 toward the rear end of the tool. In other words, the extending direction of the center line of the cylindrical surface 12a comes closer to a direction perpendicular to the cutting edge 14 than before, the cutting edge 14 having the point angle that proceeds toward the rear end of the tool as it proceeds toward the outer periphery of the tool, with the result that the curvature of the cylindrical surface 12a in the direction perpendicular to the cutting edge 14 toward the seat face 16 is made gentle. Due to the above, of the chips produced by the cutting edge 14, those produced by the convexly-curved cutting edge portion 14A may be prevented from being guided toward the inner periphery of the tool and sheared from those produced by the straight cutting edge portion 14B. Packing of the sheared chips at the center of the distal end of the tool can thus be prevented.

Figure 3E:
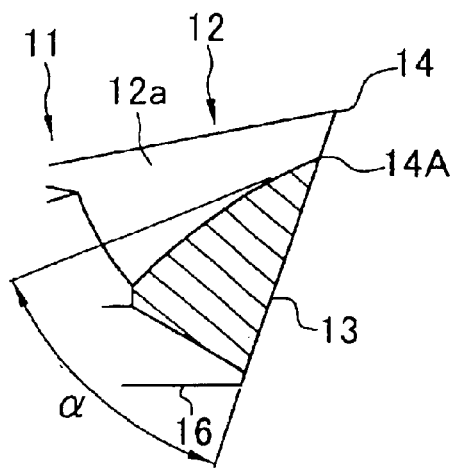
Figure 3F:
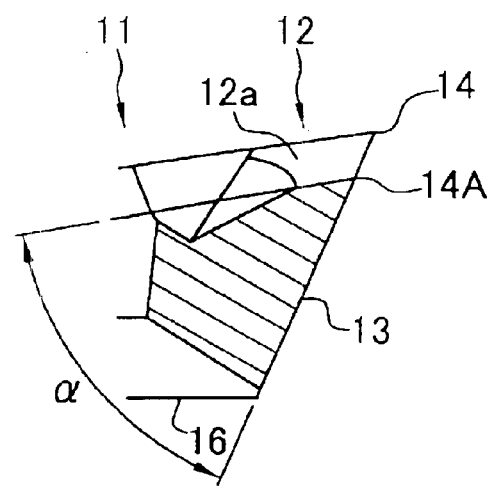
Figure 3G:
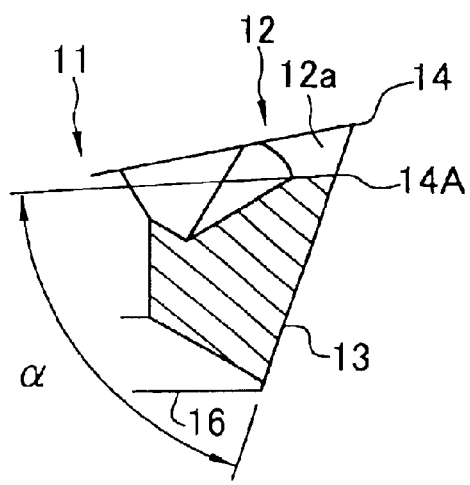
Figure 3H:
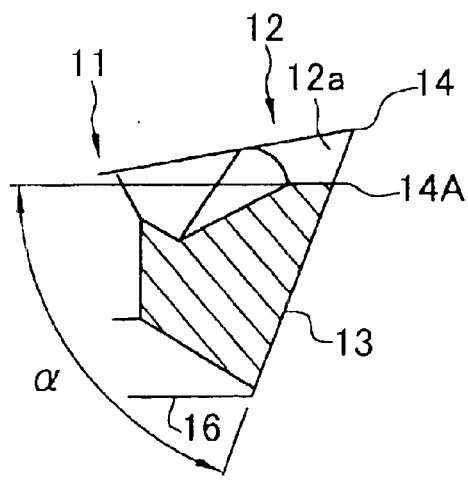
Figure 4:
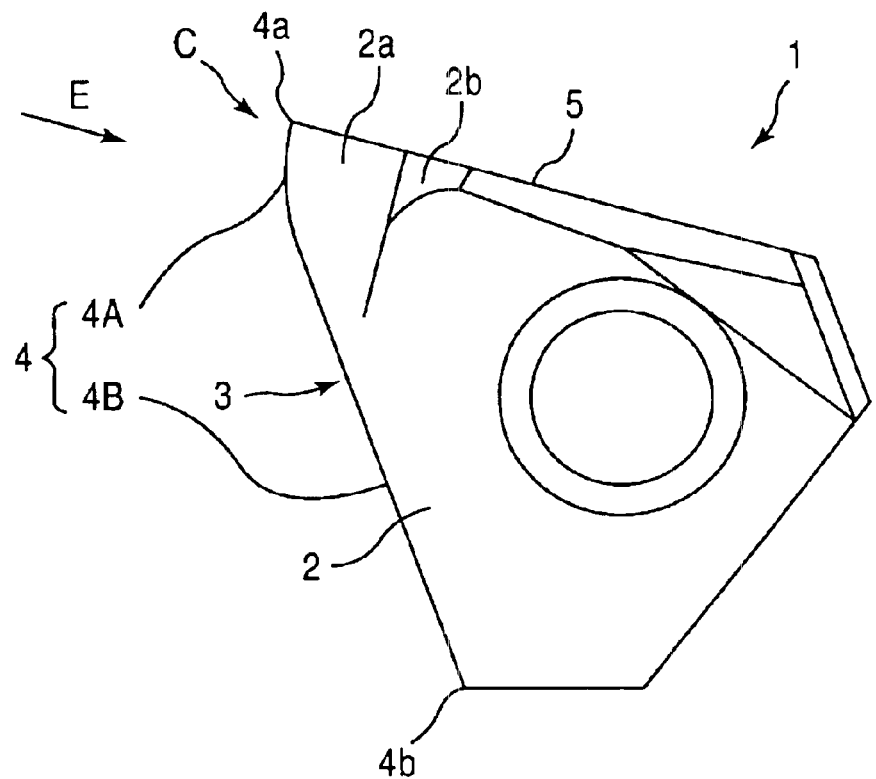
FIG. 4 is a plan view of a conventional throw-away tip for use in drilling work, as viewed from a direction opposing the rake face.
Figure 5:
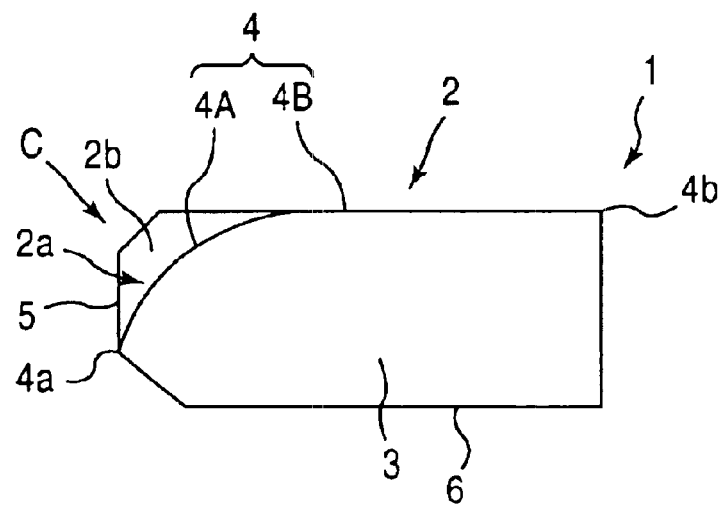
FIG. 5 is a side view of the conventional throw-away tip for use in drilling work, as viewed in a direction of an arrow E in FIGS. 4 and 6.
Figure 6:
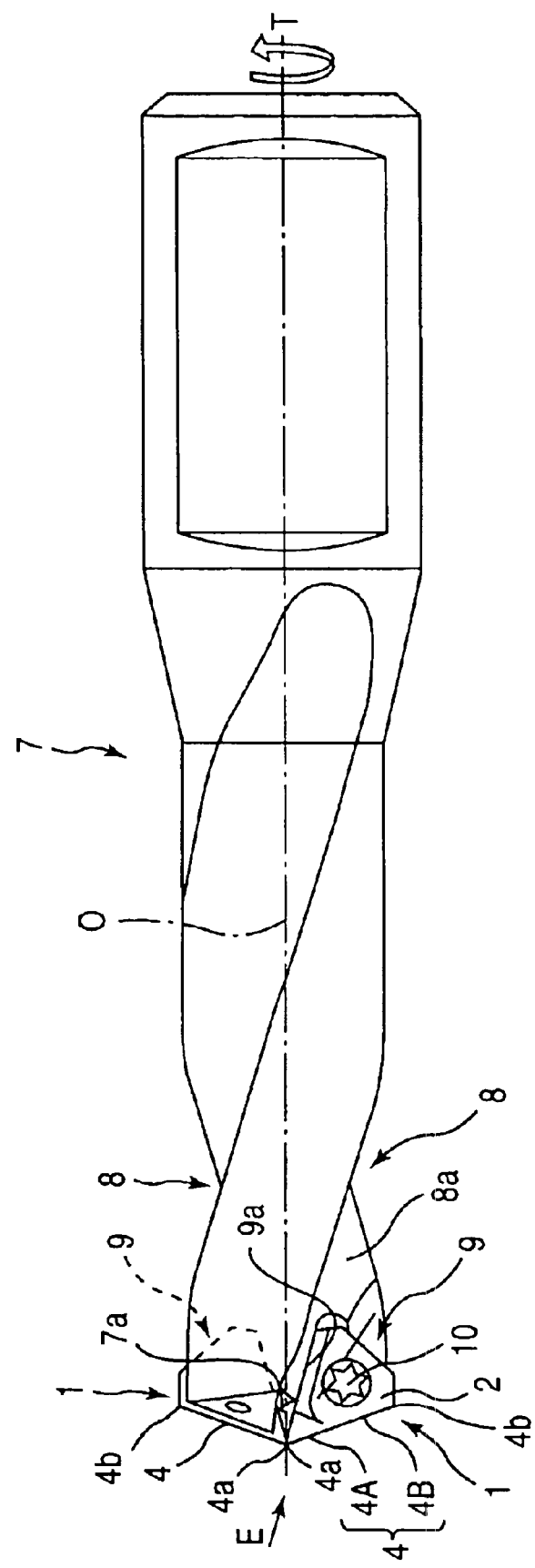
FIG. 6 is a plan view of a throw-away drilling tool with a conventional throw-away tip for use in drilling work mounted thereon.

FIGS. 3E to 3H show sections perpendicular to the cutting edge 14 with the point angle as mentioned above, taken along the line X—X in FIG. 1 near the corner C of the tip body 11, when convexly-curved cutting edge portions 14A form arc shapes of the same radius, as viewed from the directions of arrows E to H, respectively. Of these, FIG. 3F shows an X—X section of a tip of the present embodiment in which the convexly-curved cutting edge portion 14A forms an arc shape when the tip body 11 is viewed in the direction of the axis O from the distal end side of the tool as indicated by the arrow F in FIG. 1, and FIGS. 3G and 3H show X—X sections of tips of the present embodiment in which the convexly-curved cutting edge portions 14A form an arc shape when the tip body 11 is viewed in directions toward the outer periphery of the tool rear end from positions closer to the other end 14b of the cutting edge 14 than above as indicated respectively by the arrows G and H. On the other hand, FIG. 3E shows an X—X section of the conventional tip in which the convexly-curved cutting edge portion 14A forms an arc shape when the tip body 11 is viewed in a direction from near the one end 14a of the cutting edge 14 toward the outer periphery of the rear end of the tool, rather than in a direction from the distal end side of the tool along the axis O of the tool body 7. As is apparent from FIGS. 3E to 3H, with the case as shown in FIG. 3E, the curvature of the cylindrical surface 12a in a direction perpendicular to the cutting edge 14 toward the seat face 16 is sharp, and thus the chips produced at the convexly-curved cutting edge portion 14A are, due to this curvature, guided by the cylindrical surface 12a and drawn to the inner periphery side of the tool to be sheared from the chip portions produced at the straight cutting edge portion 14B and packed. In contrast, with the cases according to the present embodiment, although the radii of the arcs formed by the convexly-curved cutting edge portions 14A are the same as that of the conventional tip, the curvatures of the cylindrical surfaces 12a are small as is apparent from FIGS. 3F to 3H. Consequently, shearing between the chip portions produced by the convexly-curved cutting edge portion 14A and the chip portions produced by the straight cutting edge portion 14B will not take place, and under the effect of the inclined plane 12c on the rake face 12 and the breaker wall surface 12d, the chips are generally curled centering around the corner C and are sent out to the chip discharge grooves 8 without being packed, to be smoothly discharged and disposed.

With the thus constructed tip, because the curvature of the cylindrical surface 12a along the direction perpendicular to the cutting edge 14 becomes gentle, it is possible, as is apparent from FIGS. 3E to 3H, to enlarge the included angle α of the cutting edge 14 (convexly-curved cutting edge portion 14A) in section along the direction perpendicular to the cutting edge 14 as compared with the conventional tip in FIG. 3E. Due to this, the convexly-curved cutting edge portion 14A at the one end 14a side of the cutting edge 14, which is located in the vicinity of the axis O at the center of the distal end of the tool, may be imparted with a higher cutting-edge strength. Consequently, in cooperation with the convexity of the convexly-curved cutting edge portion 14A in the direction of rotation T of the tool, a reduction is made in the rotational speed, and the cutting edge 14 may be prevented from breakage or chipping at its one end 14a side near the axis O where a great lead acts, leading to prolonged service life of the tip and stable drilling work.

Furthermore, in the present embodiment, a small straight cutting edge portion 14C is provided at one end 14c of the convexly curved cutting edge portion 14A, so that the one end 14a of the cutting edge 14 is formed on the small cutting edge portion 14C. The small cutting edge portion 14C, as viewed from a direction in which the convexly-curved cutting edge portion 14A appears to form an arc shape, crosses at the one end 14c thereof the convexly-curved cutting edge portion 14A at an obtuse angle and extends toward the seat face 16 of the tip body 11. Accordingly, of the convexly-curved cutting edge portion 14A imparted with a high cutting-edge strength as mentioned above, especially its one end 14c, which is disposed near the axis O and is subject to the greatest load, is imparted with a further higher cutting-edge strength, so that with the tip according to the present embodiment, breakage or chipping of the cutting edge 14 at the one end 14a side is more reliably prevented and the tip service life is further extended.

In the present embodiment, as mentioned above, it is set so that, as viewed in a direction in which the convexly-curved cutting edge portion 14A appears to form an arc shape, the radius R of the arc is 28% to 42% of the diameter D of the circle formed by the other end 14b of the cutting edge 14 around the axis O, the one end 14c of the convexly-curved cutting edge portion 14A is positioned at the height A amounting to 5% to 10% of the above diameter D from the seat face 16 of the tip body 11, and the width B of the convexly-curved cutting edge portion 14A from its one end 14c to its contact 14d with the straight cutting edge portion 14B is 13% to 20% of the above diameter D, respectively.

This is because if the radius R is too small relative to the diameter D, i.e., the outer diameter of the cutting edges 14, if the height A of the one end 14c of the convexly-curved cutting edge portion 14A is too small, or if the width B is too great, the curvature of the cylindrical surface 12a in a direction perpendicular to the cutting edge 14 toward the seat face 16 becomes great and sharp so that shearing of chips cannot not be reliably prevented, irrespective of shifting parallel to the axis O or closer to the other end 14b of the cutting edge 14 the direction that enables the convexly-curved cutting edge portion 14A to appear to form an arc shape. On the contrary, if the radius R is too great, if the height A of the one end 14c is too large, or if the width B is too small, the curvature of the convexly-curved cutting edge portion 14A becomes too small, thereby making the cutting edge 14 as a whole close to a straight line. As a result, there arises a fear that the effect itself of improving the cutting-edge strength by providing the convexly-curved cutting edge portion 14A near the axis O of the tool body 7 in such a manner as to project in the direction of rotation T of the tool, will not be sufficiently obtained. It is thus preferred that the radius R, height A, and width B of the convexly-curved cutting edge portion 14A be set as in the present embodiment, and further be set within the ranges as set forth in Table 1 in accordance with sizes of the diameter D as referred to above. In each section under height A, width B, and radius R in table 1, the upper tier shows a value set by way of example for the diameter D, and the lower tier shows a preferred ratio to the diameter D.

TABLE 1

| Diameter D (mm) | Upper tier: value set (mm) Lower tier: Ratio to diameter D | | |
|---|---|---|---|
| | A | B | C |
| 15–16.5 | 1.13 | 2.76 | 5 |
| | 5–10% | 15–20% | 28–36% |
| 17–18.5 | 1.25 | 3.18 | 6 |
| | 5–10% | 15–20% | 30–39% |
| 19–20.5 | 1.5 | 3.62 | 7.5 |
| | 5–10% | 15–20% | 34–42% |
| 21–22.5 | 1.5 | 3.62 | 7.5 |
| | 5–10% | 15–20% | 30–39% |
| 23–26.5 | 1.7 | 4.13 | 8.5 |
| | 5–10% | 13–20% | 30–40% |
| 27–30.5 | 1.9 | 4.75 | 10 |
| | 5–10% | 13–20% | 30–40% |

In the present embodiment, as mentioned above, the convexly-curved cutting edge portion 14A forms an arc shape that projects in the direction of rotation T of the tool when the tip body 11 is viewed from the distal end side in the direction of the axis O of the tool body 7, or when the tip body 11 is viewed in a direction from a position closer to the other end 14b of the cutting edge 14 toward the inner periphery of the rear end of the tool. It is, however, sufficient if the convexly-curved cutting edge portion 14A is formed in a substantially arc shape when viewed as in the above. For example, the convexly-curved cutting edge portion 14A may be formed of a plurality of short straight lines connected to one another in an arc shape. In such a case, the radius R of the convexly-curved cutting edge portion 14A is obtained as the radius of an arc approximating the plurality of straight lines. Furthermore, although the convexly-curved cutting edge portion 14A is formed only at the one end 14a side of the cutting edge 14 in the present embodiment, the convexly-curved cutting edge portion may be provided on the entire length of the cutting edge 14.

Figure 7:
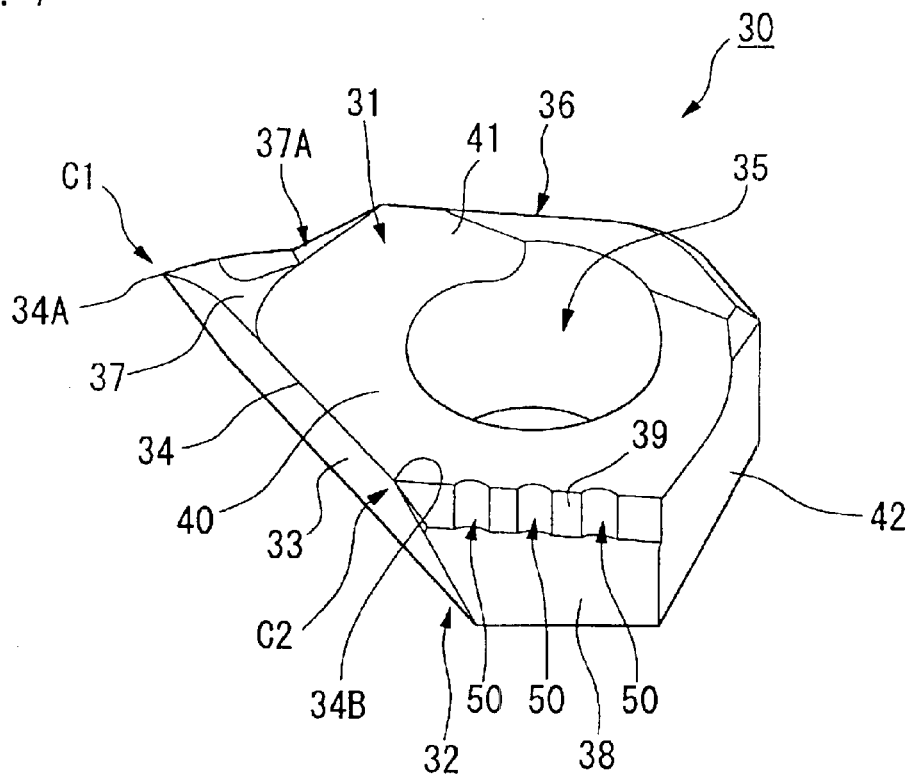
FIG. 7 is a perspective view of a tip according to another embodiment of the present invention.
Figure 8:
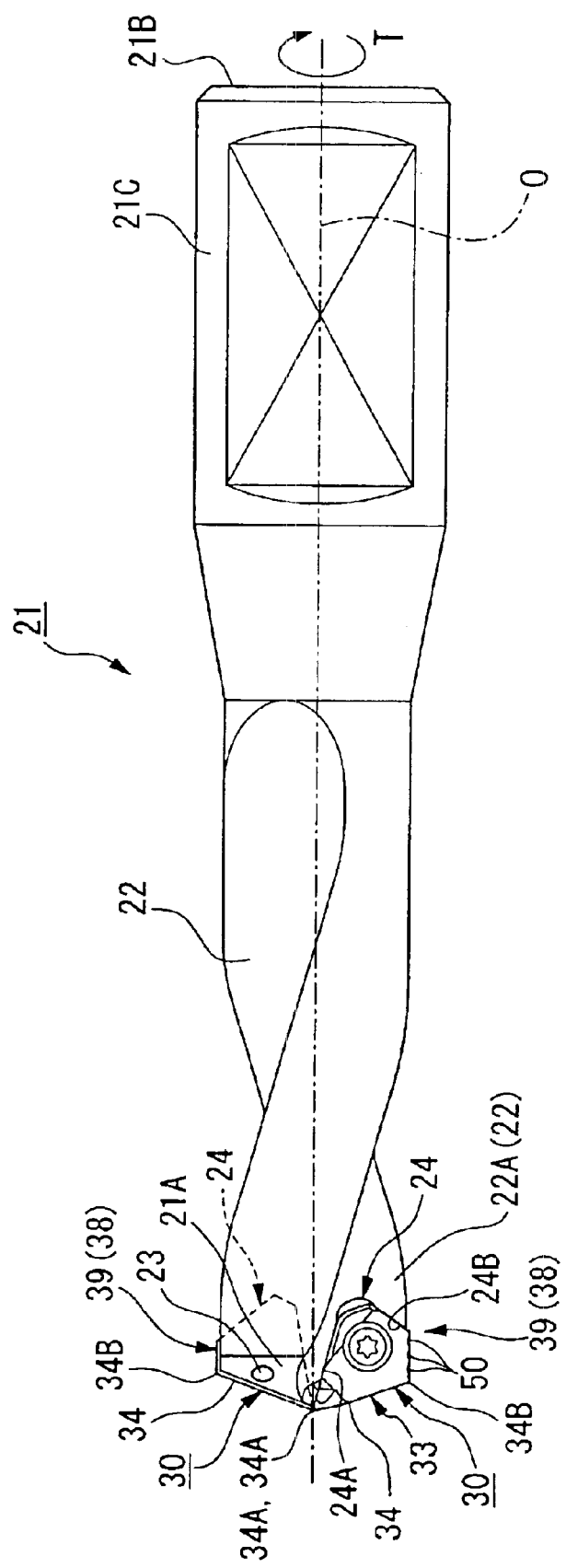
FIG. 8 is a side view of a drilling tool with the tip as in FIG. 7 mounted thereon.

A second embodiment of the present invention will now be described with reference to FIGS. 7 to 9.

In the present embodiment, as in the previously described first embodiment, a tool body 21 of a drilling tool is formed into a substantially columnar shape rotatable about an axis O, and a pair of chip discharge grooves 22 and 22, which open at a distal end face 21A of the tool body 21 and extend toward the proximal end (rear end) while twisting around the axis O rearwardly in a direction of rotation T of the tool, are formed in an outer periphery of the distal end of the tool body 21 in symmetrical relation about the axis O.

In addition, in the tool body 21, a supply path 23 for a lubricating and cooling agent or the like is formed, which extends from a rear end face 21B toward the distal end along the axis O at a portion of a shank 21C, and is branched in the vicinity of the distal end to open at the distal end face 21A. Furthermore, tip-mounting seats 24 and 24 are formed at respective distal ends of the wall surfaces 22A and 22A of the chip discharge grooves 22 and 22 facing in the direction of rotation T of the tool, and a tip as shown in FIG. 7 is mounted on each tip-mounting seat 24.

This tip has a tip body 30 made of a hard material, such as a cemented carbide alloy, in the form of a substantially pentagonal plate, the tip body 30 having a rake face 31 formed on one pentagonal surface, a seat face 32 formed on the other pentagonal surface, and a flank face 33 formed on one side surface thereof. A cutting edge 34 is formed along the crossing ridge between the flank face 33 and the rake face 31. The tip of the present embodiment is a positive tip in which the rake face 31 and the flank face 33 cross each other at an acute angle through the cutting edge 34, and the cutting edge 34 is treated for honing. A mounting hole 35 for mounting the tip body 30 on a drilling tool is formed substantially at the center of the rake face 31 so as to penetrate the tip body 30 in the thickness direction thereof to the seat face 32.

Furthermore, another side surface 36 of the tip body 11 that adjoins the one side surface constituting the flank face 33 crosses the flank face 33 at an acute angle at a corner C1 on one end 34A side of the cutting edge 34, as viewed from a direction opposing the rake face 31. On the rake face 31 at the corner C1 at which the flank face 33 and the side surface 36 cross each other, there is formed a cylindrical surface 37 that proceeds toward the seat face 32 while forming a convex curve as it proceeds toward the distal end of the corner C1. A notch 37A is formed on that portion of the cylindrical surface 37 that is located apart from the distal end of the corner C1 and at the side of the side surface 36.

Thus, through the cylindrical surface 37 formed on the rake face 31 such that it crosses the flank face 33 to form a one end 34A side portion of the cutting edge 34, that portion of the cutting edge 34 at the one end 34A side is formed to form a convex curve toward the seat face 32 as it proceeds toward the one end 34A side.

A further side surface 38 of the tip body 11 that adjoins the one side surface constituting the rake face 31 crosses the flank face 33 at an obtuse angle at a corner C2 on the other end 34B side of the cutting edge 34, as viewed from a direction opposing the rake face 31, and is inclined toward the side surface 36 as it proceeds away from the other end 34B of the cutting edge 34.

The side surface 38 is formed at the side toward the rake face 31 with a cylindrical surface that convexly curves from the rake face 31 toward the seat face 32 to provide a margin 39 of the drilling tool. The remaining portion of the side surface 38 other than the margin 39 is formed to be inclined inwardly as it proceeds toward the seat face 32. The margin 39 has a radius of curvature equal to that of a hole drilled by the drilling tool and, as will be described later, constitutes a part of a cylindrical surface centering around the axis O of the tool body 21, so as to come into sliding contact with the inner wall surface of the hole being drilled during drilling work. In the present embodiment, plural (for example, three) substantially equally spaced grooves 50 of arc-shaped cross section are formed on the margin 39 to extend in the width direction of the tip body 30 and divide the margin 39 into four.

On the rake face 31 continuous to the other end 34B side of the cutting edge 34, there is formed an inclined surface 40 that is inclined toward the seat face 32 as it proceeds away from the cutting edge 34. A breaker wall surface 41 is formed on the side of the inclined surface 40 opposite the other end 34B side portion of the cutting edge 34, the breaker wall surface 41 adjoining the inclined surface 40 smoothly and upstanding while forming a concave surface as it proceeds away from the cutting edge 34.

On the other hand, the tip-mounting seat 24 on which the above tip is mounted is defined by a bottom surface formed in such a manner as to be recessed one step from the wall surface 22A of the chip discharge groove 22 facing in the direction of rotation T of the tool, and wall surfaces 24A and 24B rising from that bottom surface to face the outer periphery of the tool body and the distal end of the tool body, respectively, and a screw hole (not shown) is formed in that bottom surface. The bottom surface of the tip-mounting seat 24 is formed so as to be inclined rearward in the direction of rotation T of the tool as it proceeds toward the rear end of the tool body so that the rake face 31 forms a positive axial rake angle with respect to the axis O of the tool body 21 when the tip is mounted. The wall surface 24A of the tip-mounting seat 24 facing the outer periphery of the tool body is formed in such a manner as to proceed toward the outer periphery of the tool body as it proceeds toward the rear end of the tool body, as viewed from a direction opposing the bottom surface of the tip-mounting seat 24. Furthermore, the wall surface 24B of the tip-mounting seat 24 facing the distal end of the tool body is formed in such a manner as to proceed toward the distal end of the tool body as it proceeds toward the outer periphery of the tool body. Incidentally, on a corner where these wall surfaces 24A and 24B cross each other, there is formed a relief for preventing the interference with the corner of the tip.

The above tip is mounted on the thus-formed tip-mounting seat 24, with the seat face 32 held in close contact with the bottom surface of the tip-mounting seat 24, the side surface 36 facing the inner periphery of the tool body and abutted against the wall surface 24A of the tip-mounting seat 24, and the side surface 42 that adjoins the side surface 18 at a side opposite the flank face 13 abutted against the wall surface 24B of the tip-mounting seat 24. In this state, the tip body 30 is seated on the tip-mounting seat 24 such that the rake face 31 faces in the direction of rotation T of the tool, the flank face 33 faces the distal end of the tool body, and the side surface 38 with the margin 39 formed thereon faces the outer periphery of the tool body. Then, a clamp screw inserted into the mounting hole 35 is screwed into the screw hole formed in the bottom surface of the tip-mounting seat 24, whereby the tip is fixed to the tool body 21. The two tips mounted on the respective tip-mounting seats 24 and 24 are the same in shape and size, and are mounted in symmetrical relation about the axis O.

The cutting edges 34 and 34 of the thus mounted tips project toward the distal end of the tool body from the distal end face 21A of the tool body 21, with their one ends 34A and 34A abutted with each other to coincide with the tool rotation center at the distal end of the tool body 21, and the cutting edges 34 and 34 are respectively inclined toward the rear end of the tool body as they proceed from the one ends 34A and 34A toward the other ends 34B, 34B. Furthermore, the margins 39 formed on the respective side surfaces 38 and 38 slightly project toward the outer periphery of the tool body 21 from the outer peripheral surface of the tool body to constitute a part of the cylindrical surface centering around the axis O.

Figure 9:
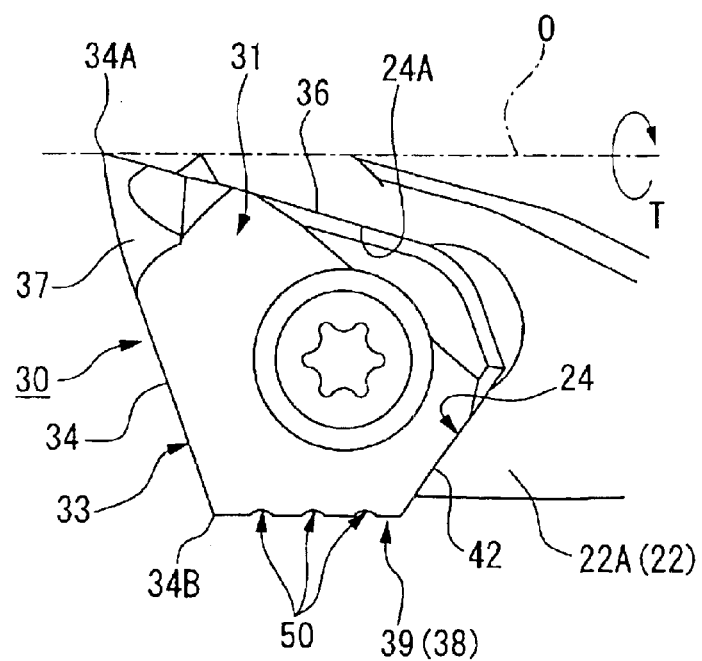
FIG. 9 is a partial enlarged view of the drilling tool as in FIG. 8.

With the tip according to the present embodiment thus mounted on a drilling tool, as shown in FIG. 9, the grooves 50 formed on the margin 39 along the thickness direction of the tip body 30 extend in the same direction as the direction of rotation T of the tool body 21, as viewed from a direction opposing the rake face 31.

In the present embodiment, because a plurality of grooves 50 are formed on the margin 39 of the tip in such a manner as to divide the same into a plurality of sections, the area of the margin 39 that comes into sliding contact with the inner wall surface of a hole being drilled is reduced as much as the area by which the grooves 50 open on the margin 39, making it possible to reduce the cutting force, and thus leading to an improvement in the working efficiency. Furthermore, because the width and length of the margin 39, i.e., the length of the margin 39 in a direction of the axis O and the width of the margin 39 in a direction perpendicular to the axis O remain the same as those of a margin 39 with no grooves 50 formed thereon, so that each divided section of the margin 39 slidingly contacts the inner wall surface of the hole being drilled to make it possible to maintain a stable cutting behavior. Stated differently, if the area of the margin 39 is enlarged in order to obtain a stable cutting behavior, suppression can still be made in the cutting force, so that progressiveness of the tool body is secured, accuracy of a hole position is maintained satisfactory, and reduction is made in the cutting force to improve the working efficiency.

Furthermore, in the present embodiment, because the grooves 50 formed on the margin 39 extend in the same direction as the direction of rotation T of the tool body 21 and divide the margin 39 in a row of sections relative to the direction of rotation, the cutting force can be reliably reduced.

Although in the present embodiment a plurality of grooves 50 have been shown to be formed on the margin 39, the present invention is not limited to this, and it is also possible to form a single groove 50 on the margin 39. In addition, the groove 50 may be formed to extend other than in the thickness direction of the tip body 30 as in the present embodiment. Furthermore, although the grooves 50 have been shown arc-shaped in cross section, such effects as mentioned above may be performed if the grooves 50 formed on the margin 39 have, for example, a rectangular, triangular, elliptic or trapezoid cross section.

Figure 10:
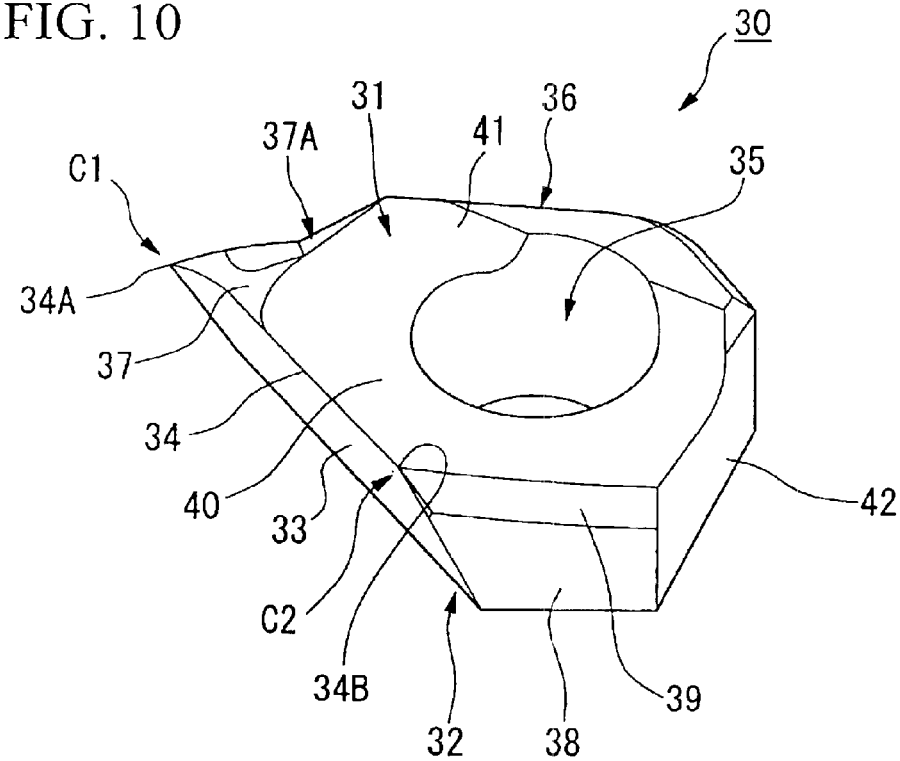
FIG. 10 is a perspective view of a tip according to a further embodiment of the present invention.
Figure 13:
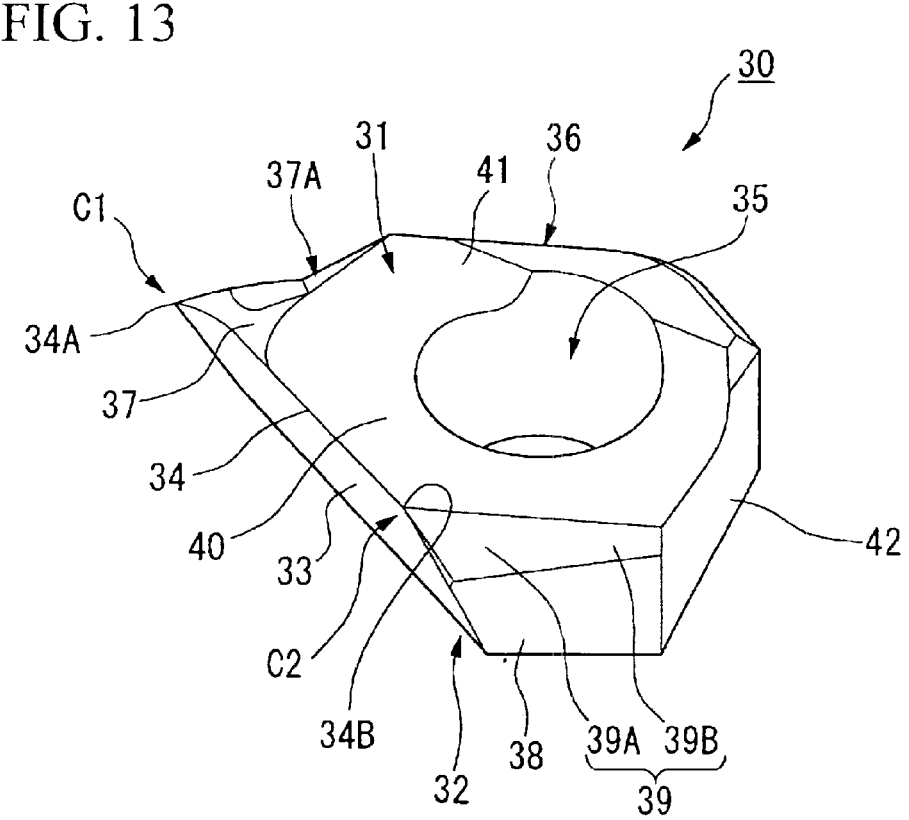
FIG. 13 is a perspective view of a tip according to yet another embodiment of the present invention.
Figure 11:
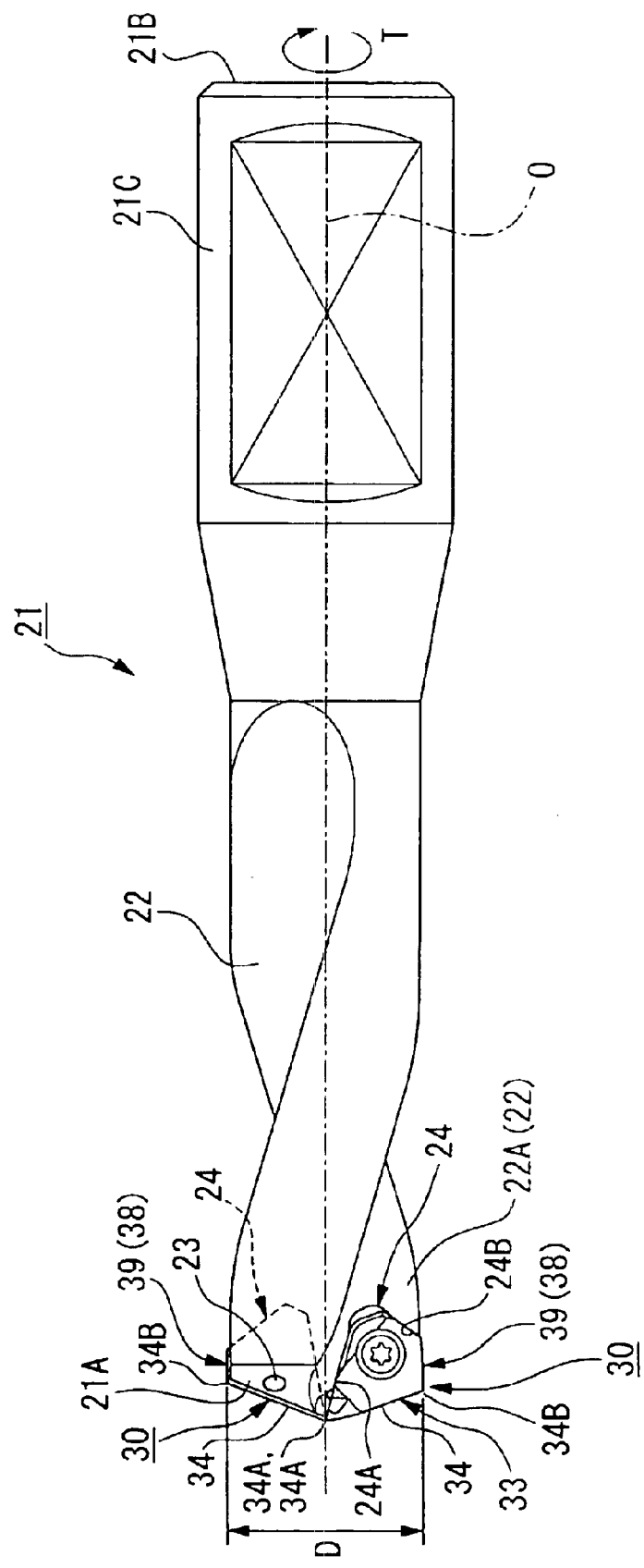
FIG. 11 is a side view of a drilling tool with the tip as in FIG. 10 mounted thereon.
Figure 12:
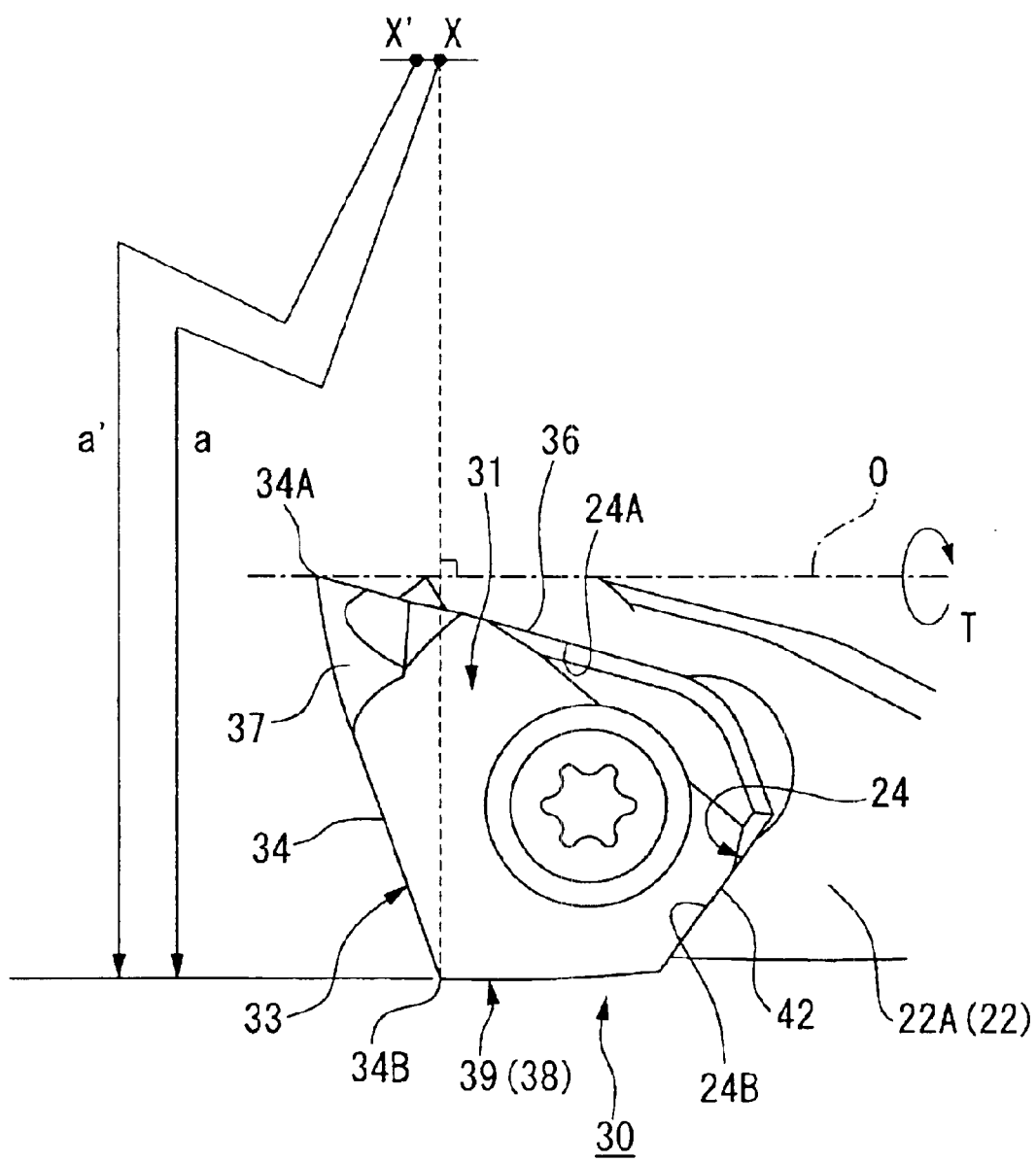
FIG. 12 is a partial enlarged view of the drilling tool as in FIG. 11.
Figure 14:
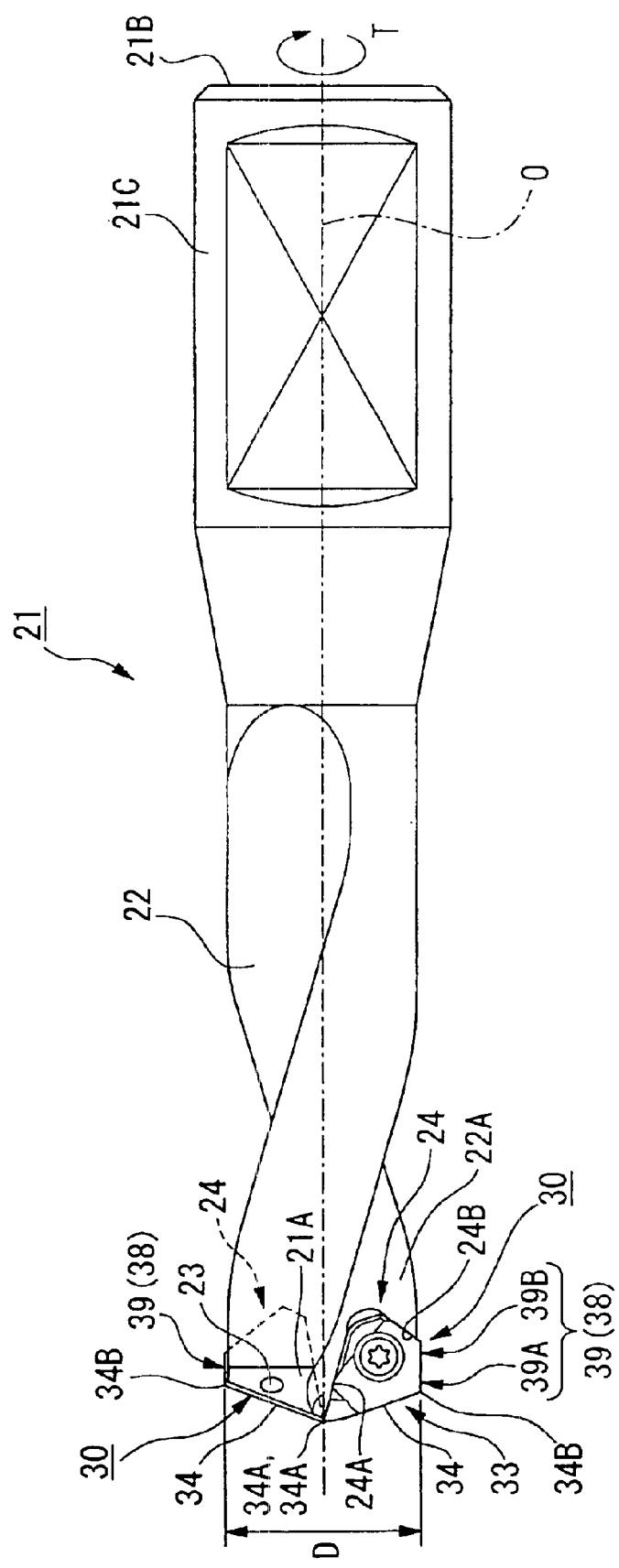
FIG. 14 is a side view of a drilling tool with the tip as in FIG. 13 mounted thereon.

A third embodiment of the present invention will now be described with reference to FIGS. 10 to 12, in which like parts or elements as in the previously described second embodiment will be given like reference numerals or characters and their description will be omitted.

In the present embodiment, the margin 39 of a tip body 30 is formed to a radius projecting outwardly of the tip body 30, as viewed from a direction opposing the rake race 31

More specifically, with a tip of the present embodiment mounted on a drilling tool, the margin 39, when the tip body 30 is viewed from a direction opposing its rake face 31, is formed to a radius having its center of curvature at a point X located at the same position as the foremost point of the margin 39 (the same position as the other end 34B of the cutting edge 34) in the direction of the axis O. In other words, the margin 39 is formed to a radius having its center of curvature at the point X that lies in a straight line extending through the foremost point of the margin 39 (the other end 34B of the cutting edge 34) and being perpendicular to the axis O, as viewed from a direction opposing the rake face 31.

The radius of curvature $\underline{a}$ of the radius formed by the margin 39, i.e., the distance from the center of curvature X to the margin 39 is in the range of 100 mm$\leq$a$\leq$1000 mm, and is set at $\underline{a}$=472 mm in the present embodiment.

The diameter D of the cutting edges 34 of the drilling tool in the present embodiment, i.e., the distance between the other ends 34B, 34B of the cutting edges 34, 34 of the two tips mounted in symmetrical relation about the axis O is set for example to 20 mm, and thus the radius of curvature a of the radius formed by the margin 39 relative to the diameter D of the cutting edges 34 is set to 5D$\leq$a$\leq$50D.

According to the present embodiment, the margin 39 of the tip forms a radius that is gradually inclined toward the inner periphery of the tool body as it proceeds from the distal (fore) to rear end side of the tool body 21, as viewed from a direction opposing the rake face 31, so that the margin 39 is automatically provided with a relief or a back taper.

Thus, because the margin 39 is provided with a relief by the radius formed thereon, if the mounting accuracy of a tip is somewhat poor, causing an irregularity in the positional accuracy of the margin 39, this radius securely imparts the margin 19 with a relief corresponding to the back taper. Consequently, the cutting force during drilling work does not increase, while maintaining a satisfactory working efficiency and realizing stabilization of the cutting edge behavior, leading to chatter free and vibration free cutting.

Furthermore, because the margin 39 formed with a radius comes into sliding contact by its smoothed radius surface with the inner wall surface of a hole being drilled and scrapes fins and the like off the inner wall surface, the inner wall surface accuracy can be improved.

Here, if the radius of curvature $\underline{a}$ of the radius formed by the margin 39 is less than 100 mm, the margin 39, as viewed from a direction opposing the rake face 31, proceeds toward the inner periphery of the tool body to an extreme extent as it proceeds toward the rear end of the tool body, and the relief provided on the margin 39 becomes greater than necessary, making it impossible to obtain the effect of the stabilization of cutting behavior that is expected from the provision of the margin 39.

In contrast, if the radius of curvature $\underline{a}$ of the radius formed by the margin 39 exceeds 1000 mm, the margin 39, as viewed from a direction opposing the rake face 31, becomes almost straight, lessening the relief imparted to the margin 39, with the result that the back taper may be reversed depending on tip mounting accuracy.

Thus, by setting the radius of curvature $\underline{a}$ of the radius formed by the margin 39 in the range of 100 to 1000 mm in the present embodiment, the relief imparted to the margin 39 could be made appropriate. It is preferred, however, that in order to more reliably obtain such effects as mentioned above, the radius of curvature $\underline{a}$ of the radius of the margin 39 be set in the range of from 300 to 700 mm.

Furthermore, in the above described embodiment, description is made of when the center of curvature X of the radius formed by the margin 39 is set at the same position as the foremost point of the margin 39, as viewed in the direction of the axis O; however, the present invention is not limited to this, and it is also possible to set the center of curvature at a point located forwardly of the center of curvature X in the direction of the axis O, and thus to set the radius of curvature of the radius of the margin 39. For example, as shown in FIG. 12, the radius of curvature a' of the radius of the margin 39 may be set, with its center of curvature X' located at a point 0.5 mm shifted from the center of curvature X toward the distal end in the direction of the axis O. In this case, it is set to a'=563 mm in the present embodiment.

A fourth embodiment of the present invention will now be described with reference to FIGS. 13 to 15B, in which like parts or elements as in the previously described second embodiment will be given like reference numerals or characters and their description will be omitted.

In the present embodiment, the margin 39 is formed to have a gradually increasing width Tgi that becomes gradually greater as it proceeds toward the other end 34B of the cutting edge 34.

Figure 15A:
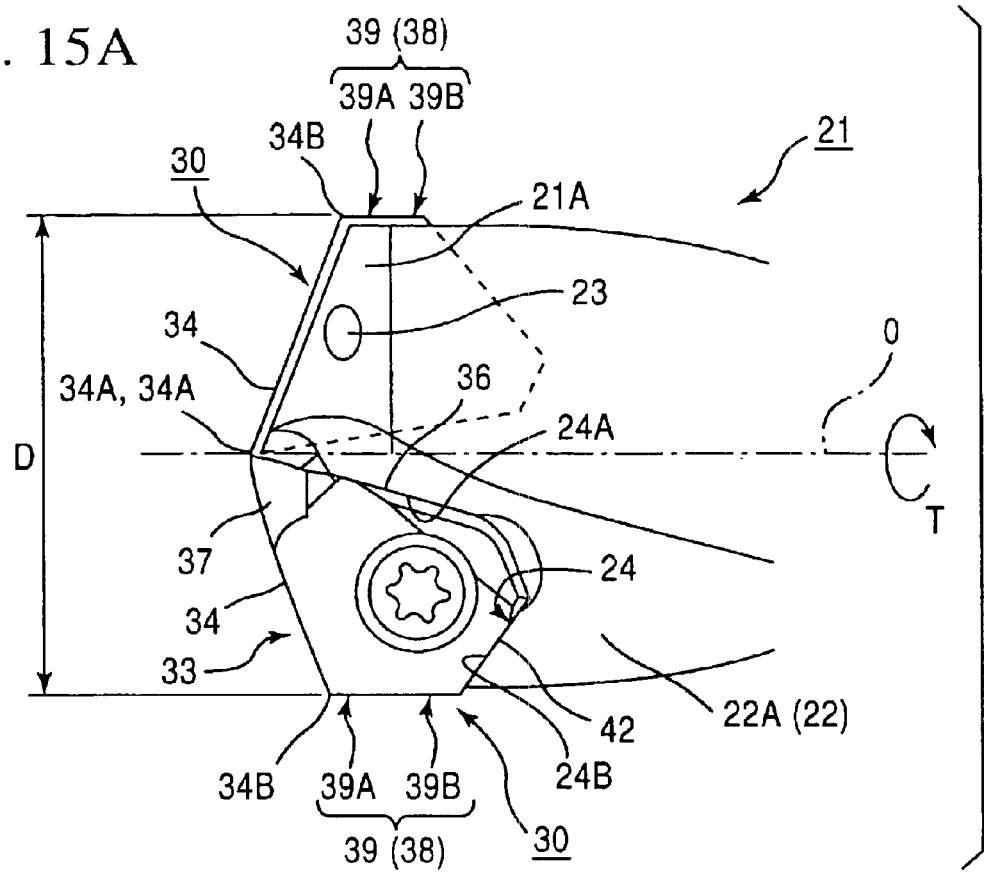
FIG. 15A is a partial enlarged view of the drilling tool as in FIG. 14.

More specifically, with a tip of the present embodiment mounted on a drilling tool, when the tip body 30 is viewed from a direction opposing the rake face 31, the gradually increasing width Tgi of the margin 39 (the length of the margin 39 in a direction perpendicular to the axis O), as shown in FIG. 15, becomes greater at a constant ratio from the rear to distal end side in the direction of the axis O. Thus, the margin 39 has a large area at a distal end side 39A thereof in the direction of the axis O, and the area at its rear end side is lessened as compared with that at the distal end side 39A.

A width T1 of the margin 39 at the most distal end side in the direction of the axis O, relative to the outer diameter D of the cutting edges 34 of the drilling tool (the distance between the other ends 34B and 34B of the cutting edges 34 and 34 of the two tips mounted in symmetrical relation about the axis O), is set in the range of $0.08D \leq T1 \leq 0.20D$, and a width T2 at the most rear end side in the direction of the axis O, relative to the outer diameter D of the cutting edges 34 of the drilling tool, is set in the range of $0.03D \leq T2 \leq 0.08D$. Incidentally, the diameter D of the cutting edges 34 of the drilling tool in the present embodiment is set, for example, to 20 mm, and the margin width of the Up of the conventional drilling tool is normally set to 0.06D.

Figure 15B:
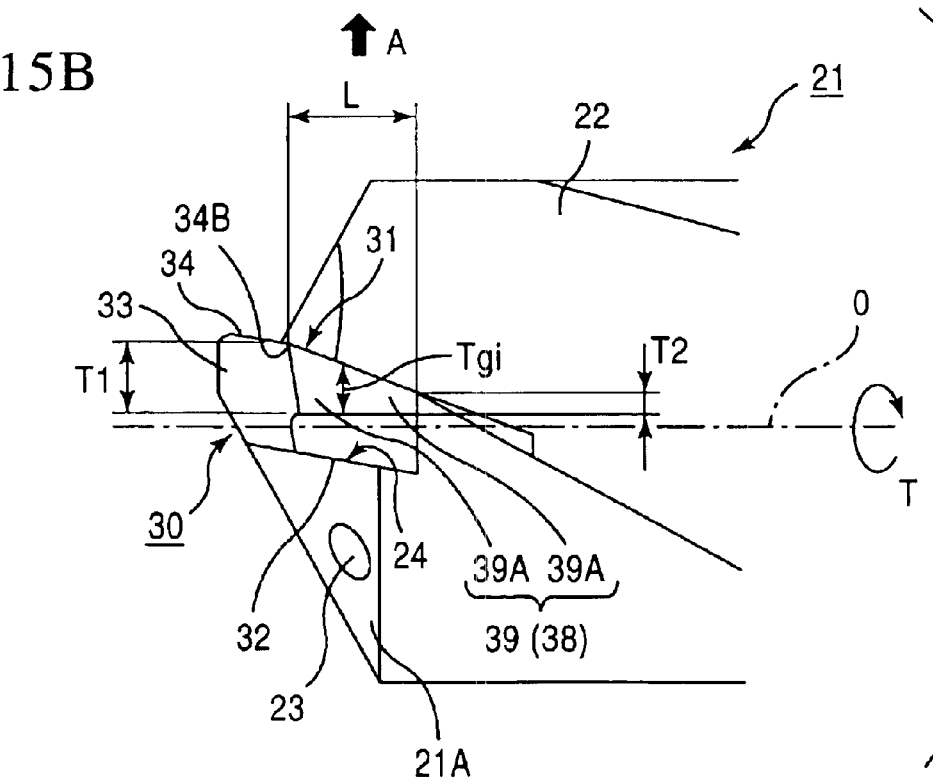
FIG. 15B is a view taken in the direction of an arrow A in FIG. 15A.

Furthermore, as shown in FIG. 15B, the length L of the margin 39 in the direction of the axis O or the maximum distance of the margin 39 in the direction of the axis O, relative to the outer diameter D of the cutting edges 34 of the drilling tool, is set in the range of $0.13D \leq L \leq 0.25D$.

According to the present embodiment, because the margin 39 has a larger area at a distal end side portion 39A thereof than in the conventional one, the distal end side portion 39A of the margin 39 near the cutting edge 34 slidingly contacts the inner wall surface of a hole drilled by a large area, so as to stabilize the cutting-edge behavior and advance the tool body 21. Such an effect is exhibited especially at the time of biting into a work when a greater stabilized cutting edge behavior is required, making it possible to maintain the positional accuracy of the hole drilled. In addition, by setting the area at a rear end side portion of the margin 39 smaller than at the distal end side portion 39A and than in the conventional one, it is also possible to reduce the cutting force, without impairing the working efficiency.

Here, if the width T1 of the margin 39 at the most distal end side in the direction of the axis O is less than 0.08D, sufficient area cannot be secured at the distal end side portion 39A, resulting in instability of the cutting behavior, and in contrast, if the width T1 is too large, the area at the distal end side portion 39A becomes unduly large, resulting in an increase in the cutting force. Likewise, if the width T2 of the margin 39 at the most rear end side in the direction of the axis O is less than 0.03D, sufficient area cannot be secured at the rear-end side portion 39B, resulting in instability of the cutting behavior, and in contrast, if the width T2 is too large, the area at the rear end side portion 39B becomes unduly large, resulting in an increase in the cutting force. In addition, if the length L of the margin 39 is less than 0.13D, margin 39 becomes too short of area to stabilize the cutting behavior, and in contrast, if the length L of the margin 39 exceeds 0.25D, an increase in the cutting force will be caused.

Thus, the widths T1 and T2 of the margin 39 are set in the ranges of $0.08D \leq T1 \leq 0.20D$ and $0.03D \leq T2 \leq 0.08D$, respectively, in the present embodiment, and the length L of the margin is set in the range of $0.13D \leq L \leq 0.25D$ as mentioned above, so that the cutting force is more reliably controlled while realizing stabilization of the cutting behavior.

Having now fully described the invention, it will be apparent to one of ordinary skill in the art that many changes and modifications can be made thereto without departing from the spirit and scope of the invention as set forth herein.

What is claimed is:

1. A throw-away tip for use with a drilling tool having a tool body rotatable about an axis, comprising:

a tip body formed as a substantially polygonal plate, which has a rake face formed on one polygonal surface thereof and a cutting edge formed at a side ridge of the rake face where the rake face intersects a flank face, one end of said cutting edge being positioned adjacent the axis at a distal end of the tool body of the drilling tool and the other end of said cutting edge being positioned at an outer periphery of the distal end of the tool body such that said cutting edge has a first point angle proceeding toward a rear end of the tool as it proceeds toward the outer periphery of the tool and a second point angle disposed generally opposite to the first point angle and forming an acute angle at an intersection of the flank face and another side face as viewed in plan view, and that said rake face faces in a direction of rotation of the tool;

a convexly curved surface formed on said rake face at least at a side of the one end of said cutting edge, which forms a curve toward the other polygonal surface of said tip body as it proceeds toward the side of the one end of said cutting edge; and a convexly curved cutting edge portion formed at a side ridge of said convexly curved surface coinciding with said side ridge of the rake face at the side of the one end of said cutting edge such that it forms a substantially arc shape projecting in the direction of rotation of the tool when said tip body is viewed from a distal end side in a direction of said axis, and when said tip body is viewed in a direction from a position closer to the other end of said cutting edge toward the inner periphery of the rear end of the tool.

2. A throw-away tip for use with a drilling tool having a tool body rotatable about an axis, comprising:

a tip body formed as a substantially polygonal plate, which has a rake face formed on one polygonal surface thereof and a cutting edge formed at a side ridge of the rake face, one end of said cutting edge being positioned adjacent the axis at a distal end of the tool body of the drilling tool and the other end of said cutting edge being positioned at an outer periphery of the distal end of the tool body such that said cutting edge has a point angle proceeding toward a rear end of the tool as it proceeds toward the outer periphery of the tool, and that said rake face faces in a direction of rotation of the tool;

a convexly curved surface formed on said rake face at least at a side of the one end of said cutting edge, which forms a curve toward the other polygonal surface of said tip body as it proceeds toward the side of the one end of said cutting edge; and a convexly curved cutting edge portion formed at a side ridge of said convexly curved surface coinciding with said side ridge of the rake face at the side of the one end of said cutting edge such that it forms a substantially arc shape projecting in the direction of rotation of the tool when said tip body is viewed from a distal end side in a direction of said axis, and when said tip body is viewed in a direction from a position closer to the other end of said cutting edge toward the inner periphery of the rear end of the tool, wherein as viewed in a direction in which said convexly curved cutting edge portion appears to form the substantially arc shape, said substantially arc shape has a radius that is 28% to 42% of a diameter D of a circle formed by said the other end of said cutting edge around said axis of the tool body, and one end of said convexly curved cutting edge portion is located at a height that is 5% to 10% of said diameter D from said the other polygonal surface of the tip body, and further comprising a straight cutting edge portion formed at a side of said the other end of said cutting edge, said straight cutting edge portion adjoining said convexly curved cutting edge portion and extending straight therefrom, and wherein a width of said convexly curved cutting edge portion between said one end thereof and a contact with said straight cutting edge portion is 13% to 20% of said diameter D.

3. A throw-away tip according to claim 1 or 2, further comprising, as viewed In a direction in which said convexly curved cutting edge portion appears to form the substantially arc shape, a small straight cutting edge portion formed at the side of said one end of said cutting edge, said small cutting edge portion crossing said convexly curved cutting edge portion at an obtuse angle at one end of said convexly curved cutting edge portion and extending toward said the other polygonal surface of the tip body.

4. A throw-away tip comprising:

a tip body formed as a substantially polygonal plate, which has a rake face formed on one polygonal surface thereof, a first side ridge of the rake face where a cutting edge is formed, a second side ridge of the rake face extending in a direction that crosses said first side ridge at one end thereof at an acute angle defining a first point angle where a first intersection is formed between a flank face and a side surface as viewed in plan view, and a third side ridge of the rake face crossing said first side ridge at the other end thereof at an obtuse angle defining a second point angle where a second intersection is formed between the flank face and another side surface as viewed in plan view;

a convexly curved surface formed on said rake face at least at a side of the one end of said cutting edge, which forms a curve toward the other polygonal surface of said tip body as it proceeds toward the side of the one end of said cutting edge; and a convexly curved cutting edge portion formed at a side ridge of said convexly curved surface coinciding with said first side ridge of the rake face at the side of the one end of said cutting edge such that it forms a substantially arc shape to project in a direction opposite the other polygonal surface of the tip body when the tip body is viewed, from a side of said first ridge, in a direction parallel to said third ridge of the rake face, and in a direction from a position closer to the other end of said cutting edge than said direction parallel to said third ridge toward said second ridge of the rake face.

5. A throw-away tip comprising:

a tip body formed as a substantially polygonal plate, which has a rake face formed on one polygonal surface thereof, one side surface serving as a flank face, and a cutting edge formed along a crossing ridge between the rake face and the flank face, a second side surface intersecting the flank face to form a first point defining an acute angle between the flank face and the second side surface as viewed in plan view and a third side surface intersecting the flank face to form a second point disposed generally opposite to the first point defining an obtuse angle between the flank face and third side surface as viewed in plan view;

another side surface adjoining the flank face, which has a cylindrical surface formed thereon that forms a convex curve from said rake face toward the other pentagonal surface of the tip body to provide a margin used in drilling work; and means provided on said margin for facilitating the drilling work.

6. A throw-away tip according to claim 5, wherein said means comprises at least one groove formed on said margin.

7. A throw-away tip according to claim 6, wherein said at least one groove is formed in a thickness direction of said tip body.

8. A throw-away tip according to claim 5, wherein said means comprises a radius formed by said margin that, when the throw-away tip is mounted on a drilling tool, has a center of curvature at a point located at the same position as the distal end of the margin or forwardly thereof in a direction of an axis of the drilling tool, as viewed from a direction opposing the rake face.

9. A throw-away Up according to claim 8, wherein said radius formed by said margin has a radius of curvature set in the range of 100 to 1000 mm.

10. A throw-away tip according to claim 5, wherein said means comprises a gradually increasing width Tgi of said margin that, when the throw-away tip is mounted on a drilling tool, becomes gradually greater from a rear end side toward a distal end side in a direction of an axis of the drilling tool.

11. A throw-away tip according to claim 10, wherein a length L of said margin in said direction of the axis of the drilling tool, relative to the outer diameter D of the cutting edges of the drilling tool, is set in the range of $0.13D \leq L \leq 0.25D$.

12. A throw-away tip comprising:

a tip body formed as a substantially polygonal plate, which has a rake face formed on one polygonal surface thereof, one side surface serving as a flank face, and a cutting edge formed along a crossing ridge between the rake face and the flank face;

another side surface adjoining the flank face, which has a cylindrical surface formed thereon that forms a convex curve from said rake face toward the other pentagonal surface of the tip body to provide a margin used in drilling work; and means provided on said margin for facilitating the drilling work, wherein said means comprises a gradually increasing width Tgi of said margin that, when the throw-away tip is mounted on a drilling tool, becomes gradually greater from a rear end side toward a distal end side in a direction of an axis of the drilling tool, wherein a width T1 of said margin at the most distal end side in said direction of the axis of the drilling tool, relative to an outer diameter D of cutting edges of the drilling tool, is set in the range of $0.080D \leq T1 \leq 0.20D$, and a width T2 of said margin at the most rear end side in said direction of the axis, relative to the outer diameter D of the cutting edges of the drilling tool, is set in the range of $0.03D \leq T2 \leq 0.08D$.

13. A throw-away tip according to any one of claims 5 to 11 in combination with a drilling tool comprising:

a pair of chip discharge grooves formed in an outer periphery of a tool body rotatable about an axis;

a tip-mounting seat provided at a distal end of a wall surface of each of the chip discharge grooves facing in said direction of rotation of the tool; and a throw-away tip mounted on said tip-mounting seat such that said rake face of the throw-away tip faces in the direction of rotation of the tool, said flank face faces a distal end of the tool body, and said margin faces the cuter periphery of the tool body to constitute a part of a cylindrical surface centering around said axis.

14. A throw-away tip according to claim 12, wherein a length L of said margin in said direction of the axis of the drilling tool, relative to the cuter diameter D of the cutting edges of the drilling tool, is set in the range of $0.13D \leq L \leq 0.25D$.

* * * * *